(12) United States Patent
Pownall

(10) Patent No.: US 12,252,419 B2
(45) Date of Patent: Mar. 18, 2025

(54) TRANS-CHANNEL REACTION CELL AND METHOD OF USE

(71) Applicant: Thomas G. Pownall, Lima, NY (US)

(72) Inventor: Thomas G. Pownall, Lima, NY (US)

(*) Notice: Subject to any disclaimer, the term of this patent is extended or adjusted under 35 U.S.C. 154(b) by 445 days.

(21) Appl. No.: 17/373,556

(22) Filed: Jul. 12, 2021

(65) Prior Publication Data
US 2022/0009800 A1    Jan. 13, 2022

Related U.S. Application Data

(60) Provisional application No. 63/050,597, filed on Jul. 10, 2020.

(51) Int. Cl.
*C02F 1/461* (2023.01)
*C02F 1/463* (2023.01)

(52) U.S. Cl.
CPC .......... *C02F 1/463* (2013.01); *C02F 1/46114* (2013.01); *C02F 2001/46133* (2013.01); *C02F 2201/46135* (2013.01); *C02F 2201/46165* (2013.01)

(58) Field of Classification Search
CPC ................ C02F 1/463; C02F 2001/46157
See application file for complete search history.

(56) References Cited

U.S. PATENT DOCUMENTS

| | | | | |
|---|---|---|---|---|
| 6,663,766 B1* | 12/2003 | Adin | ............... | C02F 1/463 204/554 |
| 8,540,860 B2* | 9/2013 | Cho | ............... | C02F 1/467 204/674 |
| 2006/0096853 A1* | 5/2006 | King | ............... | C02F 1/463 204/230.2 |
| 2010/0224483 A1* | 9/2010 | Cho | ............... | C02F 1/467 204/278.5 |
| 2015/0246830 A1* | 9/2015 | Lalli | ............... | C02F 1/463 204/242 |
| 2020/0115261 A1* | 4/2020 | Aly | ............... | C02F 1/463 |

* cited by examiner

*Primary Examiner* — Luan V Van
*Assistant Examiner* — Andrew Koltonow
(74) *Attorney, Agent, or Firm* — Bassett IP Strategies; David F. Bassett

(57) ABSTRACT

The disclosure provides for a device and method for initiating an electrocoagulation reaction. The device may include one or more electrodes, conductive rods, conductive pipe, non-conductive pipe, and an adjustable power source wherein the electrodes have cutouts through each to allow for concentrated magnetic and electrical fields to form increasing the efficiency of the electrocoagulation reaction. The adjustable power source may be connected to the electrodes, conductive rods, and conductive pipe. The electrocoagulation device may be combined with another electrocoagulation device wherein each electrocoagulation device comprises electrocoagulation electrodes different than that of the electrocoagulation electrodes of the other electrocoagulation device. The present invention provides for contaminant removal from fluids such as wastewater including such wastewaters as fracking water, plating waste water, septic waste water and the like, potable water, pond water, hot tub water, and the like.

12 Claims, 21 Drawing Sheets

TRANS-CHANNEL ELECTRODE (TCE)
TOP-DOWN VIEW

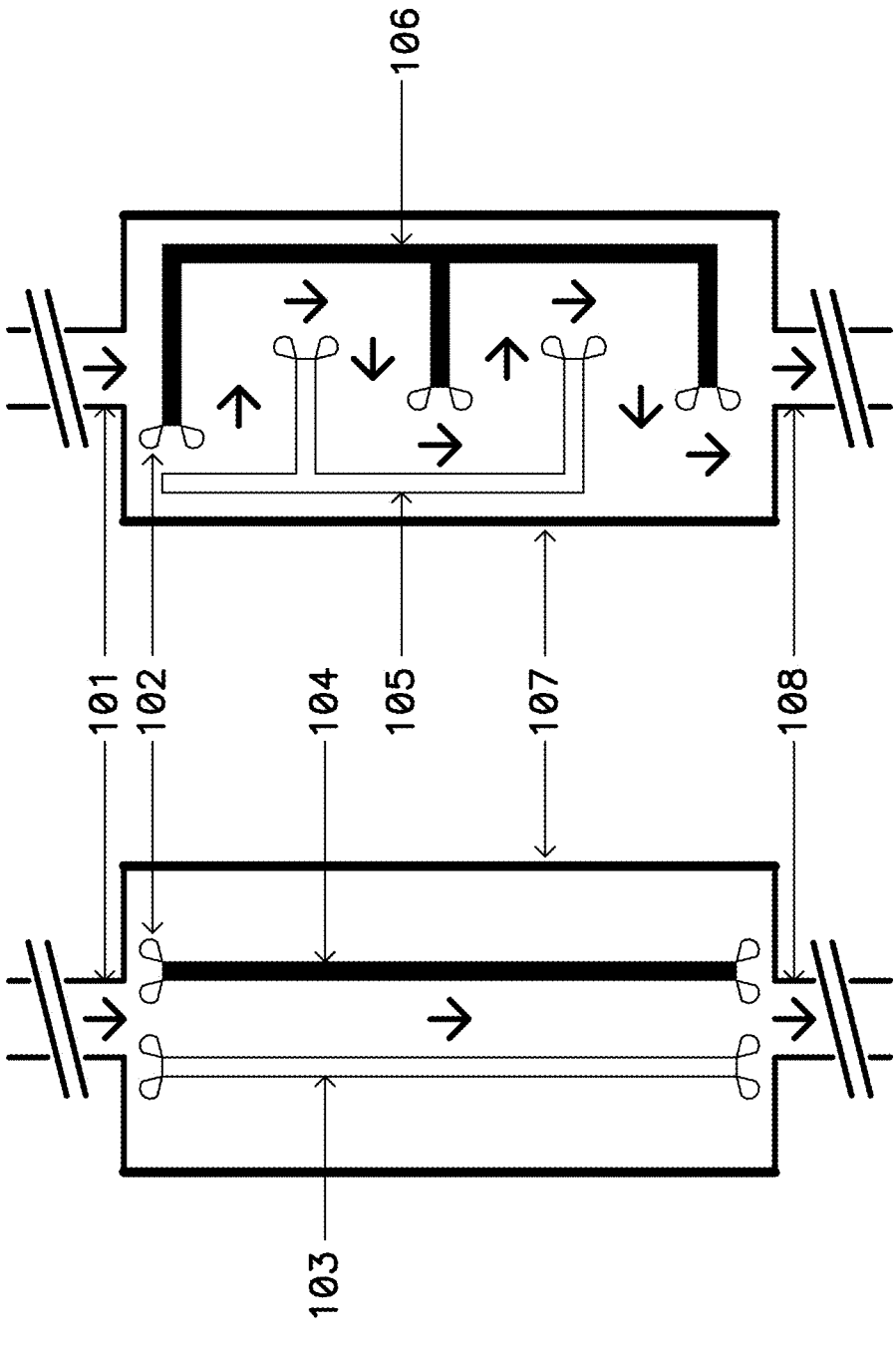

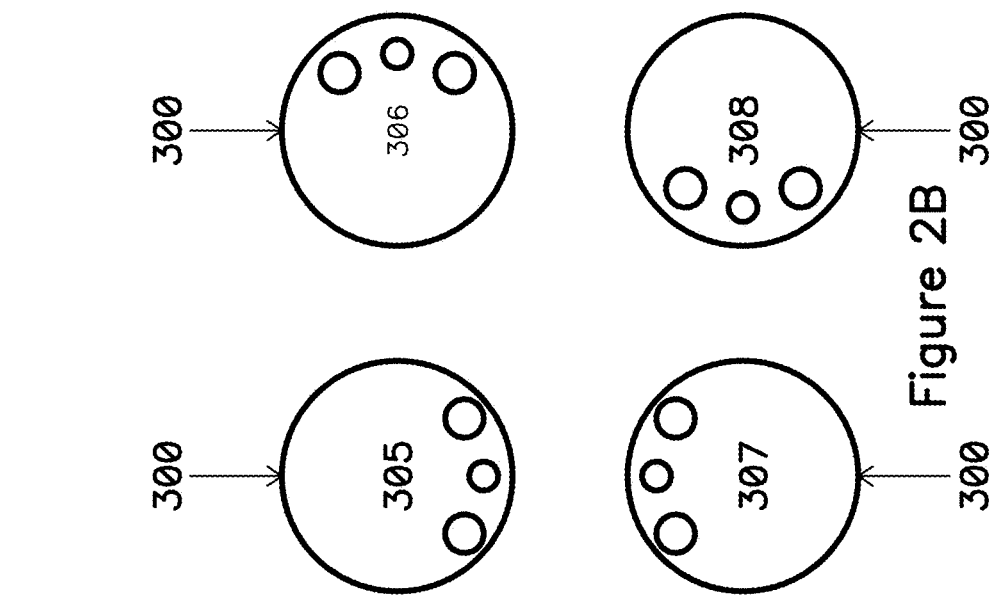
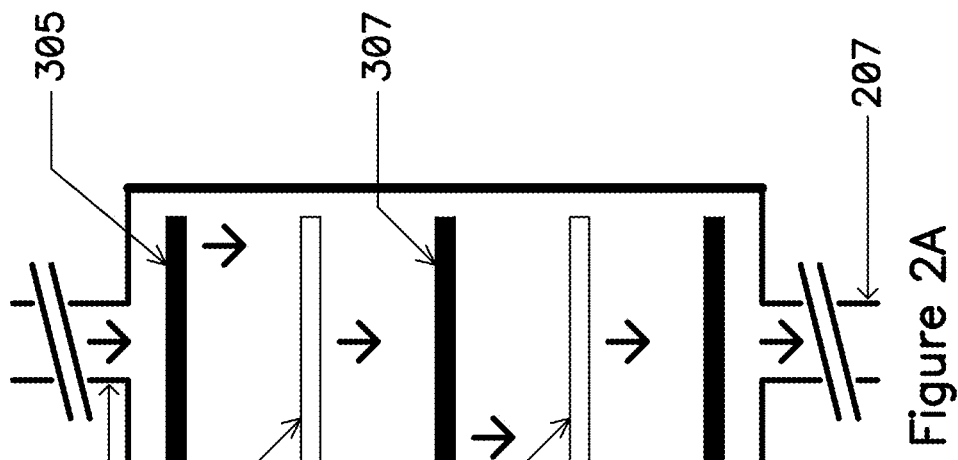
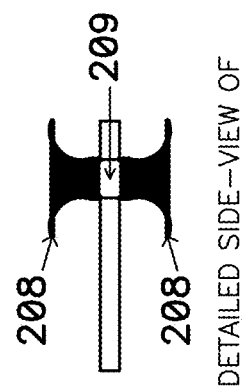
Figure 2A
Figure 2B
Figure 2C

TRANS-CHANNEL ELECTRODE (TCE)
TOP-DOWN VIEW

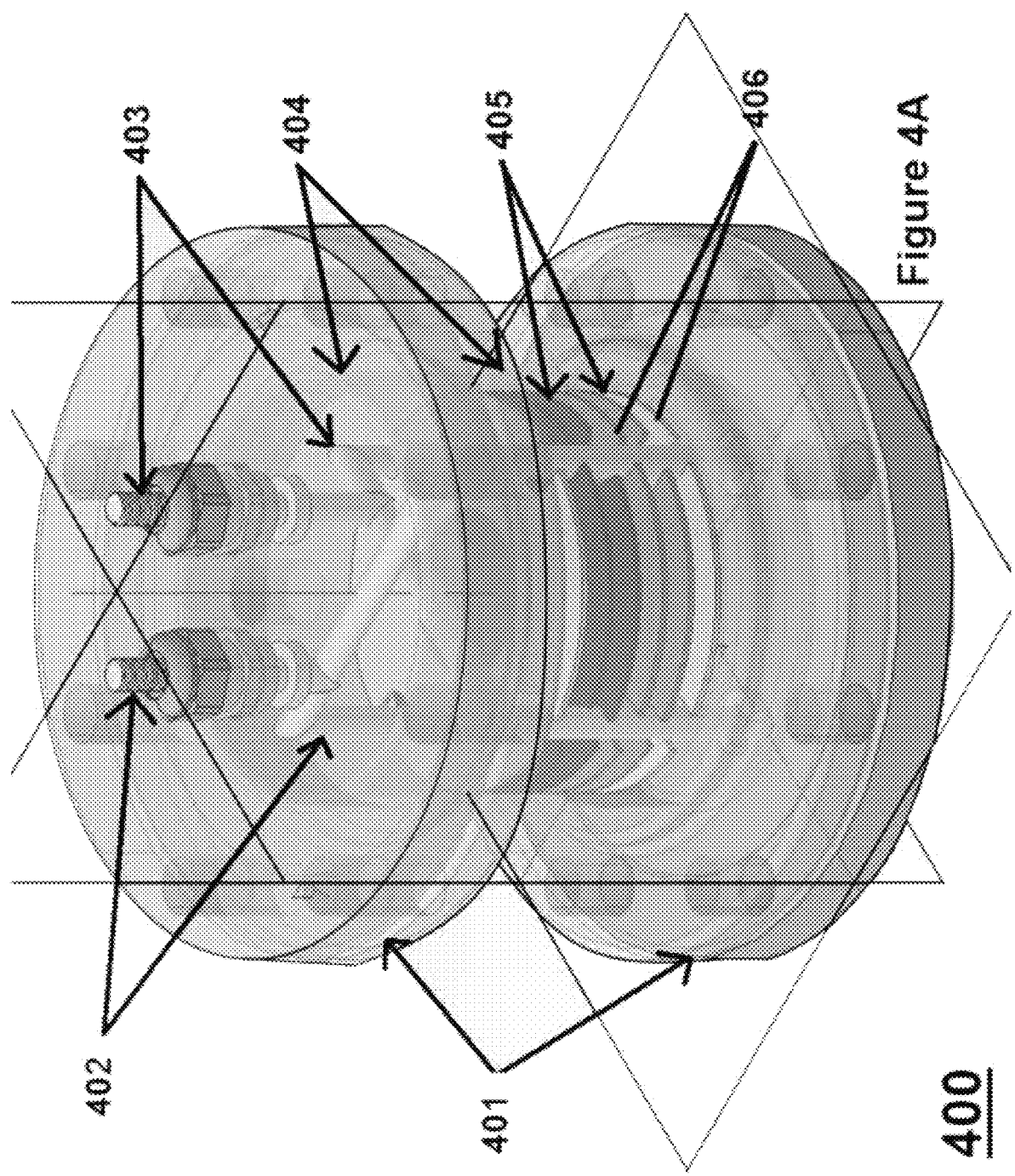

TRANS-CHANNEL ELECTRODE (TCE)
TOP-DOWN VIEW

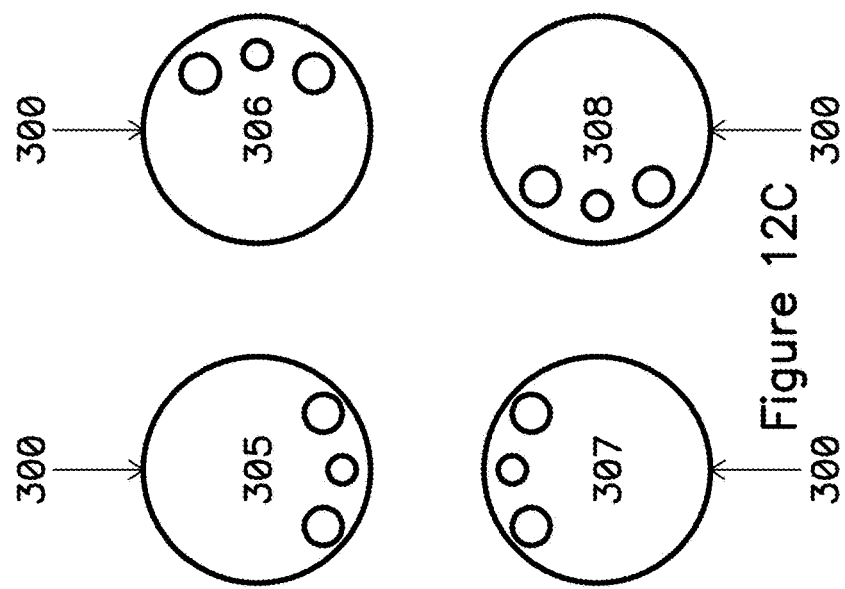
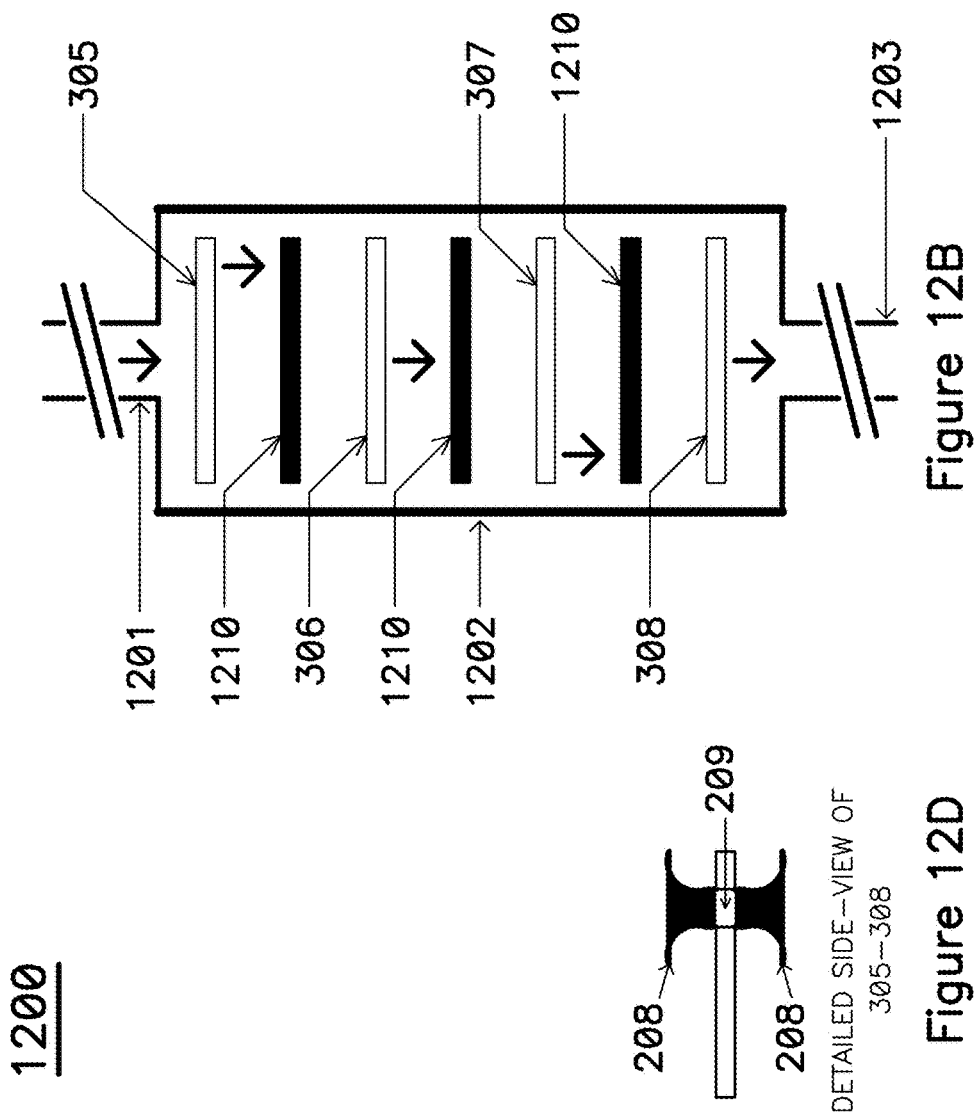
Figure 12C
Figure 12B
Figure 12D

TRANS-CHANNEL REACTION CELL AND METHOD OF USE

FIELD OF THE INVENTION

The present disclosure is directed to a device for chemically, electrically, and magnetically cleaning contaminants from a fluid stream such as water and methods of use.

BACKGROUND OF THE INVENTION

Electricity and the related energy, magnetism, have been used to treat and condition water since the late 1800's. The treatment of water with electricity is known as electrocoagulation or electroflocculation and has seen periods of popularity in the 1920's, 1960's, 1980's, and today.

The core principle behind electrocoagulation has not changed since its inception over a century ago—introduce a flow of electrical potential across a quantity of contaminated water between oppositely charged metal plates. This affects a body of contaminated water in a number of different ways including:
  a. Disrupting groupings of water molecules in which contaminants are trapped and suspended;
  b. Disrupting groupings of contaminants in which water molecules are trapped and suspended;
  c. Disrupting the electrical charges which keep contaminants suspended in solution; and
  d. Sacrificing metal ions from the electrodes to form molecules with charged contaminants.

In short, electrocoagulation disrupts the forces which allow contaminants to be suspended in solution throughout a body of water or other fluid. This disruption causes the contaminants to bond to each other and to metal sacrificed from the electrodes. Contaminants then start to come out of suspension; compounds (primarily organic) with a lower density than the fluid they had been suspended in float to the top of the fluid, and compounds (mostly inorganic) with a density greater than the fluid they had been suspended in sink to the bottom of the fluid. These contaminants that leave solution can be removed from the fluid via mechanical means. The less dense compounds may be removed via processes such as skimming and the more dense compounds may be removed via processes such as decanting followed by rinsing.

Electrocoagulation has been demonstrated in a variety of academic works to be useful for removing and reducing the concentration of a wide variety of contaminants from fluids, but its use as a water treatment method remains limited. The main issue limiting the use of electrocoagulation is not the physics of the process, but the efficiency.

As those skilled in the art are aware, there are several different methods to perform electrocoagulation, some of which focus on expending electrical energy and some of which focus on expending (sacrificing) the metal electrodes. The expense of both the electrical energy and of the sacrificial metal electrodes have limited the usage of electrocoagulation to treat water.

In electrocoagulation systems of the present art, the fluid flow past the electrodes generally follow one of two models: either a linear channel flow or a serpentine channel flow. Referring to FIG. 1A, an example of a linear channel electrocoagulation unit 100 of the present art is depicted. As depicted, fluid flows into the reaction cell 100 via the reaction cell inlet 101 and exits via the reaction cell outlet 108; while inside the reaction cell 100, fluid flows between at least one pair of electrode plates 103, 104 wherein each plate is comprised of a flat, solid, metallic plate 103 oriented parallel to the other plate 104 and along the same axis as a conduit 107 a fluid will flow through. These plates 103, 104 and the conduit 107 form a channel for the fluid to flow through. One electrode 103, an anode, will have a positive charge associated with it and the other electrode 104, a cathode, will have a negative charge associated with it.

Referring to FIG. 1B, an example of a serpentine channel electrocoagulation unit 190 of the present art is depicted. As depicted, at least one pair of electrode plates 105, 106, wherein each plate 105, 106 of the electrode pair is comprised of a flat, solid, metallic plate. The electrode plates are set in a conduit and are oriented perpendicularly to the conduit 107. This causes fluid flowing through the conduit to flow in a winding, serial, serpentine channel formed between the at least one pair of solid plate electrodes (an anode and a cathode) flowing from the inlet 101 through to the outlet 108.

The Linear Channel reaction cell model has by far been the most popular, and was propagated under the commonly held belief that the central variable in electrocoagulation determining the efficiency of the contaminant removal was to which how much electrical energy a given quantity of contaminated fluid was exposed. In this linear channel model, wherein fluid flows through a channel between at least one pair of electrode plates, said plates comprising an anode and a cathode, the ratio of electrical energy to fluid quantity is managed by regulating five factors:
  a. the flow rate of the contaminated fluid through the channel;
  b. the voltage of electricity flowing between plates in the channel;
  c. the current of the electricity flowing between the plates in the channel;
  d. the surface area of the plate fluid interfaces; and
  e. the quantity of channels through which the fluid flows.

The Serpentine Channel reaction cell model is a relatively recent innovation in the field of electrocoagulation, and has been demonstrated in at least one study to be more effective than the Linear Channel model, consuming much less energy and seeing much less wear and tear over time, with lower overall operating costs. The chief arguments made for promoting the Linear Channel model were ease of setup and ease of maintenance, not effectiveness or efficiency.

The reasons for the Serpentine Channel model's greater relative efficacy are twofold:
  a. by forcing the fluid through a channel which repeatedly changes directions the turbulence of the fluid is greatly increased; and
  b. electrons tend to group together along sharp edges 102. To put it another way, on any electrically charged surface, most of the charge will be concentrated along any sharp edges of the surface.

Turbulence is beneficial to the process of electrocoagulation because it temporarily disrupts groupings of fluid molecules in which contaminants are trapped and suspended; by decreasing the fluid surface tension which makes it harder for contaminants to remain suspended.

In other words, the benefits of both turbulence and the density of the electrical charge are concentrated around sharp edges 102.

In the Linear Channel model, the benefits are concentrated around the outside edges 102 of the cell plates—which means that the process of electrocoagulation is not spread evenly across the surface of the plate as was previously thought.

In the Serpentine Channel model, the benefits are concentrated around every twist and turn of the serpent—and the total edge surface area is typically significantly greater with the Serpentine Channel model relative to that of the Linear Channel model.

While the Serpentine Channel model represents an improvement in many respects over the more widely used Linear Channel model as fluid flows across more edge surface of the plates, further improvements are available which improve the efficiency of removal of contaminants from fluid by increasing the surface area and turbulence of flow even more. The present invention as will be described herewith provides both these features.

Electrocoagulation systems of the prior art also exhibit a tendency to foul as contaminants coagulate out of solution and collect on the positive plate surfaces (plate 103 for the linear channel reaction cell 100 and plate 105 for the serpentine channel reaction cell 190). There is also a tendency for significant corrosion to occur at the negative plate (plate 104 for the linear channel reaction cell 100 and plate 106 for the serpentine channel reaction cell 190). The present invention minimizes both these issues by alternating the polarity of the electrodes at predetermined frequencies which minimizes the corrosion of the electrode plates and also minimizes plate fouling by the coagulation of contaminants removed from solution in the fluid. The present invention further may be configured to work in horizontal and vertical configurations; function in linear and serpentine configurations; introduces mechanical elements which promote turbulence in the fluid flow through the system; concentrates the magnetic field density as compared to linear or serpentine configurations due to the additional edges introduced by the TCE plate design; and induces the fluid to crest, which forces de-oxygenation or thinning of the fluid relative to the increased magnetic field density.

BRIEF SUMMARY OF THE INVENTION

Referring to FIGS. 2A-2C a preferred embodiment of an exemplary electrocoagulation device, a Trans-Channel Electrode (TCE) 200 is depicted. The present invention provides for contaminant removal from fluids such as fracking water, plating waste water, septic waste water, ponds, hot tubs, and the like. A non-exhaustive listing of the range of contaminants that may be removed via this system include, but are not limited to metals, bacteria, chlorinated hydrocarbons, cooking fats, and crude oil waste. While the embodiments of the electrocoagulation system can be used to remove contaminants from any fluid that is or can be made electrically conductive, to simplify the description of the device and its processes throughout this specification we will often refer to water as the influent fluid into the electrocoagulation system. Though we may refer to the fluid as being water or contaminated water, the teaching of the present invention may be used with any other fluid that is or can be made electrically conductive and the teachings are not limited to the treatment of contaminated water. The TCE 200 comprises a plate fabricated from a conductive metal, a conductive metal alloy, or a surface coated or impregnated with either a conductive metal or conductive metal alloy such as iron, steel, aluminum, titanium, and the like, or a conductive composite material such as those disclosed in U.S. Pat. Nos. 4,832,870 and 6,251,978 the entire disclosure of each is herewith incorporated by reference, and the like. FIG. 3 depicts an overhead view of a single TCE 300 of the present invention.

Referring to FIG. 4A, a cross sectional view of a cell 400 containing several TCEs is depicted. The cell housing 404 is preferably comprised of an electrically non-conductive material such as polyvinyl chloride (PVC) and supports a series of TCE's 405, 406, 407, 408. In another preferred embodiment of the present invention the cell housing is comprised of an electrically conductive material and the interior surface of the cell housing is coated with a non-conductive material such as PVC. Referring again to FIG. 2 and FIG. 3 and also to FIGS. 4B and 4C, the plate of each TCE 405, 406, 407, 408, 300 preferably has cutouts 301 around the exterior edge 304 to accommodate the support infrastructure 402, 403 allowing for a series of TCEs to be bundled in a cell. Each plate preferably further has channels 302, tapped through the plate z-axis to permit the flow of fluid through the plate. The channels provide two prime purposes: they allow fluid to flow from the interstitial space before the TCE through the TCE into the interstitial space located before the next TCE, and they also provide for an increase in edge surfaces for the fluid to flow across which allows for increases in the turbulence of fluid flow relative to flow between parallel plates as the boundary layer of laminar flow at the fluid—solid surface interface is reduced relative to that that would be experienced in a linear channel unit or even a serpentine channel unit. Both of these effects (increased turbulence and increased charge) provide for increased effectiveness of the water treatment across the surface of the TCE As depicted in FIGS. 5A and 5B, the charge of the electrical field is greatest at the sharp edge 501 of a channel cut through the TCE which will provide for the increased electrocoagulation of contaminants in the fluid.

The channels through each plate are a major difference between the structure of an electrocoagulation unit of the prior art and the electrocoagulation unit taught by the present invention. As is readily observable, the electrical field of the present invention is greatest at the edges of the openings cut through the TCE and is where the treatment action is greatest. The electrical field surrounding a plate of the prior art is much weaker across the bulk of the surface of the plate which is where the fluid predominantly contacts the plates and thus the efficiency of the electrocoagulation is reduced relative to that of the present invention.

It is important to note that the express intent of the openings is to increase treatment action across the surface of the TCE, and not simply to permit water to flow through. As the openings through the TCE increase relative to the cross sectional area of the TCE surface, the more effective the treatment action generated by the TCE will be. Please note: serpentine channel reaction cells typically have a small gap between each plate and the reaction cell casing to allow for fluid to flow across the plate in the Z-direction with the gap oriented 180 degrees away from the gap in the plate immediately before or after the particular plate, they might on occasion instead include an opening through the serpentine channel plate surface to allow for fluid to flow across the plate in the Z-direction, these do not anticipate the teaching of the present invention as their purpose was strictly to allow fluid to flow through the reaction chamber and not to effect the efficiency of the treatment of fluid flowing through the chamber.

As an example of how the surface area of hole edge is associated with a particular void area through an opening or a series of opening, a single circular opening with a diameter of 1 inch will have a circumference of approximately 3.14 inches. One circular opening with a diameter of 0.25" will have a circumference of roughly 0.78 inches; 15 similar openings will have a total circumference of 11.7 inches— while having the same total cross-sectional area as a 1 inch opening. This means that a 1 inch diameter hose could feed the same amount of water at the same rate through a TCE with either a single 1 inch diameter opening or fifteen 0.25 inch diameter openings, but the smaller openings provide almost 4 times as much total edge space for treatment action to occur relative to the single larger opening.

This increase in total edge surface area for fluid to flow across relative to total plate surface aligned with the fluid flow direction is a novel feature of the present invention.

An alternative method to cutting holes through individual TCE plates which would also increase edge surface area would be to punch grates through the surface with a metal die which would cause sharp edges to emerge on both sides of the plate and create an aperture which would cause turbulence in a fluid flowing past and through the plate to increase and also increase the electrical field at the points where the edges are created when an electric field is induced across the plate. This would allow for a linear channel electrocoagulation cell to approach the efficiencies of the electrocoagulation cell of the first embodiment of the present invention which would be beneficial when treating highly viscous fluids such as black strap molasses or the like.

The present invention also allows for frequent and nearly constant polarity reversals of the electrical current to the unit thus allowing individual TCE plates to alternately function as anodes and cathodes.

As will be made readily apparent in the detailed description of the invention, embodiments of the present invention allow for a wide range of contaminant removal. Based upon the contaminants to be removed and the concentrations of the contaminants and the desired usage of the treated water (for drinking, agricultural usage, or industrial usage) the system can be sized to allow for desired treatment levels. Among the parameters that may be set upon construction of a treatment system are the quantity of reaction cells, the reaction cell casing diameter of each reaction cell, the diameter and arrangement of the TCE's placed within each reaction cell, the quantity and arrangements of cutouts through each TCE, and the spacing between adjoining TCEs. Among the parameters that may be adjusted during operation of the system are the pump rate and electric power flowing between TCEs in each reaction chamber which may be adjusted by altering the voltage, current, or dwell time of the electricity supplied. These all allow for altering the flowrates of fluid through the reaction cells which allow for altering the turbulence experienced by the flow of fluid and also the electrical fields to which the fluid is exposed as it flows through the system. Further, post electrocoagulation settling of solids denser than the fluid precipitating out of the fluid and flotation of solids less dense than the fluid can be adjusted to optimize removal of these solids prior to using or further treating the fluids.

Further, when assembled into a full treatment skid, the skid may be readily configured with at least one reaction chamber with TCE's comprised of a conductive material such as iron, mild steel, or steel and at least one reaction chamber with TCE's comprised of a different conductive material such as aluminum or titanium which allows for greater treatment efficiencies than using only one type of TCE.

BRIEF DESCRIPTION OF THE DRAWINGS

The description will be more fully understood with reference to the following figures, which are presented as various embodiments of the disclosure and should not be construed as a complete recitation of the scope of the disclosure, in which like numerals refer to like elements, wherein:

FIG. 1A depicts a representative view of an electrocoagulation device of the prior art configured for linear flow;

FIG. 1B depicts a representative view of an electrocoagulation device of the prior art configured for serpentine flow;

FIGS. 2A, 2B, and 2C depict representative views of an electrocoagulation device of the present invention;

FIGS. 4A, 4B, and 4C depict a cross sectional view of a first embodiment of the electrocoagulation device;

FIGS. 12A-12D depict a exemplary view of a mixing chamber plate of an exemplary electrocoagulation system;

LIST OF PARTS

Figure 3:
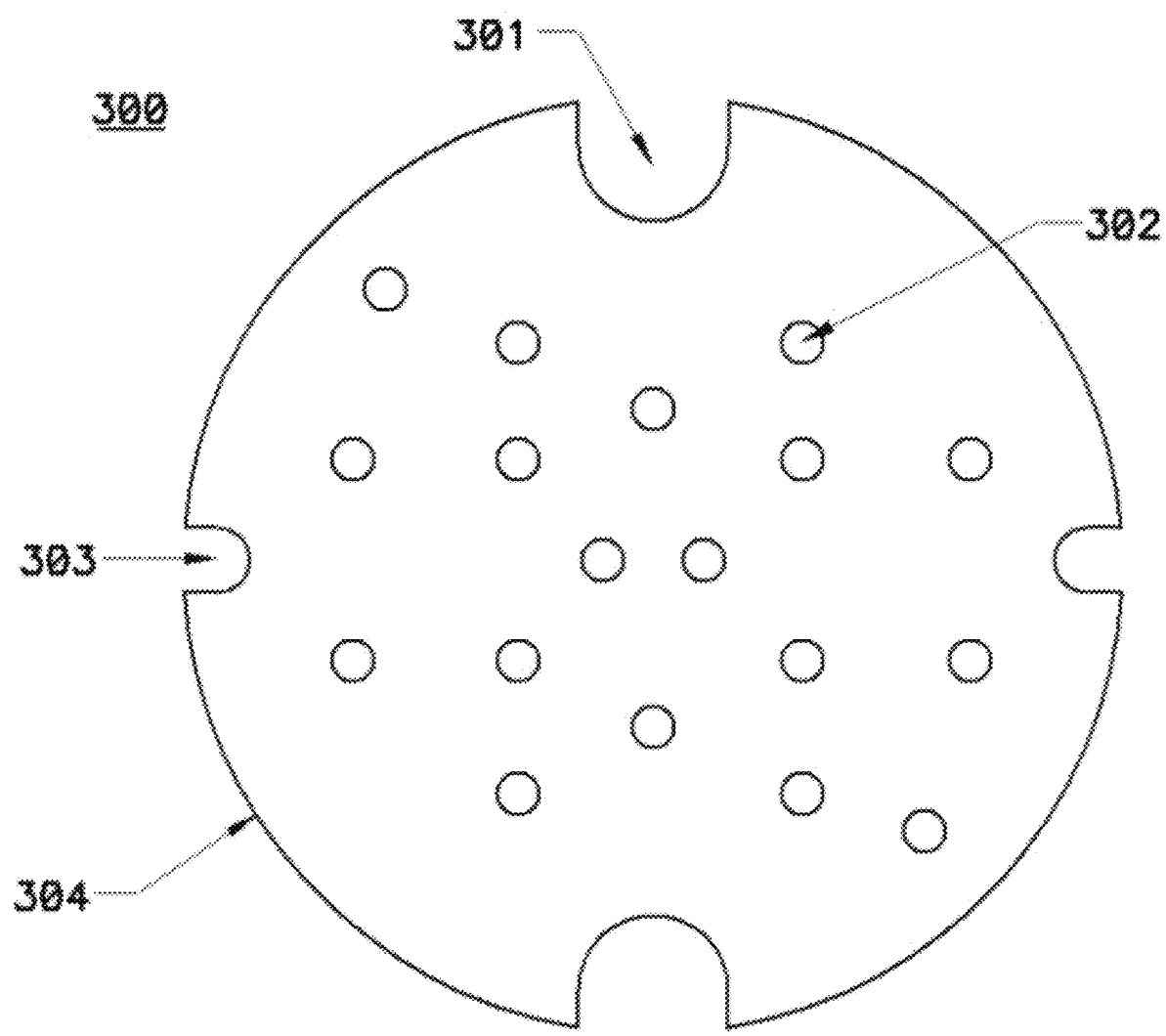
FIG. 3 depicts an overhead view of the device in one embodiment.

The following is a listing of parts presented in the drawings:
- 100—Linear-channel reaction cell;
- 101—Reaction cell inlet;
- 102—Magnetic field bloom at each external edge of plate;
- 103—Linear channel plate, anode;
- 104—Linear channel plate, cathode;
- 105—Serpentine channel plate, anode;
- 106—Serpentine channel plate, cathode;
- 107—Reaction cell casing;
- 108—Reaction cell outlet;
- 190—Serpentine-channel reaction cell;
- 200—Trans-channel electrode reaction cell;
- 201—Reaction cell inlet;
- 206—Reaction cell casing;
- 207—Reaction cell outlet;
- 208—Magnetic field bloom at edge of each opening in plate;
- 209—Aperture/hole/drill;
- 210—TCE;
- 300—Single TCE;
- 301—Large notch, electrode rod passes through without making contact;
- 302—Aperture/hole/drill; size can vary, shape can vary, placement can vary, quantity can vary; should be asymmetrically placed;
- 303—Small notch, electrode rod anchors here;

304—External edge of electrode;
305—TCE as per 300, tied to anode;
306—TCE as per 300 oriented at an approximately about 90 degree to about 180 degree angular rotation from the TCE plate 305, tied to cathode;
307—TCE as per 300 oriented at an approximately about 90 degree to about 180 degree angular rotation from the TCE plate 306, tied to anode;
308—TCE as per 300 oriented at an approximate about 90 degree to about 180 degree angular rotation from the TCE plate 307, tied to cathode;
400—Electrocoagulation device;
401—Flange with inlet/outlet;
402—Electrode rod assembly;
403—Electrode rod assembly of opposite polarity;
404—Reaction cell casing;
405—TCE as per 300, tied to anode;
406—TCE as per 300, rotated approximately about 90 angular degrees to about 180 angular degrees from 405, tied to cathode;
420—Point where TCE as per 300 is connected to 403;
421—Point where 402 passes through TCE as per 300 without touching;
422—Point where TCE as per 300 is connected to 402;
423—Point where 403 passes through TCE as per 300 without touching;
501—Sharp edge in surface along which electromagnetic field is concentrated;
600—TCE;
601—Large notch, electrode rod passes through without making contact;
602—Aperture/hole/drill; size can vary, placement can vary, shape can vary, quantity can vary; should be asymmetrically placed;
603—Small notch, electrode rod anchors here;
604—External edge of electrode;
700—Electrocoagulation skid;
701—OPTIONAL slug filter;
702—OPTIONAL pump (with OPTIONAL communications such as CAN bus or RS485 or the like);
703—OPTIONAL electrical valve;
704—Pump or elevation change or other propellant mechanism sufficient to force the fluid into and through a TCE reaction chamber (720 & 790);
705—OPTIONAL fluid temperature sensor;
706—OPTIONAL fluid flow sensor;
707—OPTIONAL fluid pressure sensor;
708—OPTIONAL voltage sensor;
709—OPTIONAL clamp-on current sensor;
710—Holding chamber where fluid processed through 700 can OPTIONALLY be allowed to settle before being processed through 790, as per 805;
711—OPTIONAL chemical analysis module;
720—Primary TCE reaction chamber constructed preferably of mild steel or the like;
790—Secondary TCE reaction chamber constructed of preferably of aluminum or the like;
800—Electrocoagulation skid control matrix;
801—Magnetic control amplifiers with feedback;
802—Brain box;
803—Pump used for flow control;
804—TCE reaction chamber constructed of material such as steel;
805—OPTIONAL storage tank;
806—TCE reaction chamber constructed of material such as aluminum;
807—Valve;
901—Electrocoagulation device;
901—Electrode rod assembly;
902—Electrode rod assembly of opposite polarity relative to electrode 901;
903—Reaction cell casing;
904—TCE as per 600, tied to anode;
905—TCE as per 600, rotated 90 degrees from 904, tied to cathode;
906—TCE as per 600, rotated 90 degrees from 905, tied to anode;
907—TCE as per 600, rotated 90 degrees from 906, tied to cathode;
1000—Control panel;
1001—Display showing the approximate voltage of the electrical power supplied to first TCE reaction chamber (refer to 804) in the pair of cells currently being monitored;
1002—Display showing the approximate amperage of the electrical power supplied to first TCE reaction chamber (refer to 804) in the pair of cells currently being monitored;
1003—Display showing the approximate wattage of the electrical power introduced to the fluid traveling through the first TCE reaction chamber (refer to 804) in the pair of cells currently being monitored on a per-gallon basis;
1004—Display showing the voltage of the electrical power supplied to second TCE reaction chamber (refer to 806) in the pair of cells currently being monitored;
1005—Display showing the amperage of the electrical power supplied to second TCE reaction chamber (refer to 806) in the pair of cells currently being monitored;
1006—Display showing the approximate wattage of the electrical power introduced to the fluid traveling through the second TCE reaction chamber (refer to 806) in the pair of cells currently being monitored on a per-gallon basis;
1007—Flow rate of fluid traveling through the TCE reaction chamber pair currently being measured, in gallons per minute;
1008—Display indicating (by number) which TCE reaction chamber pair is being monitored on 1001 through 1007;
1009—Knob control for manual adjustment of the approximate voltage of the electrical power supplied to first TCE reaction chamber (refer to 804) in the pair of cells currently being monitored;
1010—Knob control for manual adjustment of the approximate amperage of the electrical power supplied to first TCE reaction chamber (refer to 804) in the pair of cells currently being monitored;
1011—Switch control to enable or disable manual adjustment of the electrical power supplied to first TCE reaction chamber (refer to 804) in the pair of cells currently being monitored;
1012—Knob control for manual adjustment of the approximate voltage of the electrical power supplied to second TCE reaction chamber (refer to 806) in the pair of cells currently being monitored;
1013—Knob control for manual adjustment of the approximate amperage of the electrical power supplied to second TCE reaction chamber (refer to 806) in the pair of cells currently being monitored;
1014—Switch control to enable or disable manual adjustment of the electrical power supplied to second TCE reaction chamber (refer to 804) in the pair of cells currently being monitored;

1015—Mode switch that allows the user to select between an automated or manually controlled process (using controls 1009 through 1014);
1016—Master on/off switch for the system as a whole;
1017—Visual indicator (blue) that the first TCE reaction chamber (refer to 804) in the pair of cells currently being monitored is energized;
1018—Visual indicator (blue) that the second TCE reaction chamber (refer to 806) in the pair of cells currently being monitored is energized;
1019—Visual indicator (yellow) that the brain box governing the system is functional;
1020—Visual indicator (red) that the rate at which the fluid is flowing through the pair of cells currently being monitored is too low;
1021—Visual indicator (red) that the temperature of the pair of cells currently being monitored is either too high or too low;
1022—Visual indicator (red) that the voltage measured in the pair of cells currently being monitored is too low;
1023—Visual indicator (red) that the voltage measured in the pair of cells currently being monitored is too high;
1024—Visual indicator (green) that the system is running;
1025—Visual indicator (green) that the system has power;
1026—Visual indicator (yellow) that a good communications channel has been established to the system (via Ethernet for example);
1027—Visual indicator (yellow) that data is being transmitted over the communications channel;
1028—Visual indicator (red) that some kind of error has occurred on the communications channel;
1029—Connection port for an external storage device;
1030—Connection port for communications;
1031—Button to eject/disconnect external storage;
1100—AC power distribution block;
1101—Fuse, slow-blow, 2 amp;
1102—Power supply, AC input, DC output;
1103—Power supply, AC input, DC output;
1104—Circuit breaker, 6 amp;
1105—Circuit breaker, 10 amp;
1106—AC power supply for TCE reaction chamber constructed of material such as steel (refer to 804);
1107—AC power supply for TCE reaction chamber constructed of material such as aluminum (refer to 806);
1108—Relay contactor;
1109—Emergency on/off switch;
1110—Circuit breaker, 20 amp;
1200—electrocoagulation device with non-conductive spacer elements;
1201—Reaction cell inlet;
1202—Reaction cell casing;
1203—Reaction cell outlet;
1210—Non-conductive spacer element;
1211—Back gasket ring channel;
1212—Front gasket ring channel;
1213—Gasket ring (can be inserted into 1211 or 1212, thickness can be varied in order to vary the space created between TCEs);
1214—Mounting orifice;
1300—Electrocoagulation device;
1301—Primary TCE reaction chamber as per 804, individual TCEs (refer to 300) constructed of mild steel;
1302—Secondary TCE reaction chamber as per 806, individual TCEs (refer to 300) constructed of aluminum;
1303—Holding chamber where fluid processed through 1301 and 1302 can be allowed to settle;
1304—Brain box, with connections to OPTIONAL fluid temperature sensor, OPTIONAL fluid flow sensor, OPTIONAL fluid pressure sensor, OPTIONAL voltage sensor, OPTIONAL clamp-on current sensor;
1305—Power supply, AC input, DC output;
1306—OPTIONAL holding chamber where fluid allowed to settle in 1303 can be drawn off and stored for household use; and
1400—Small skid mounted electrocoagulation system.

DETAILED DESCRIPTION OF THE INVENTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As those skilled in the art are aware, water treatment via electrocoagulation is not a fixed uniform process. There is a general outline for how the process works, but there are also variables which can greatly alter the specifics. Water can be contaminated with a wide variety of substances in a wide variety of concentrations, all of which will alter the conductivity, viscosity, and pH of the water. Some contaminants must be removed in greater amounts than others in order for the water to be useful for its chosen purpose (drinking versus agricultural versus industrial), whereas other contaminants might be deemed harmless. In order to best treat any given body of contaminated water, samples must first be tested, and then the operating parameters of the water treatment system may be set in order to optimize the process and reduce or eliminate waste.

Representative examples of operating parameters of preferred embodiments of the present invention will be presented herewith. It should be obvious to those skilled in the art that these examples provide recommendations for substances, materials, and dimensions; the examples are representative and are not meant to be taken as definitive in and of themselves.

Figure 4B:
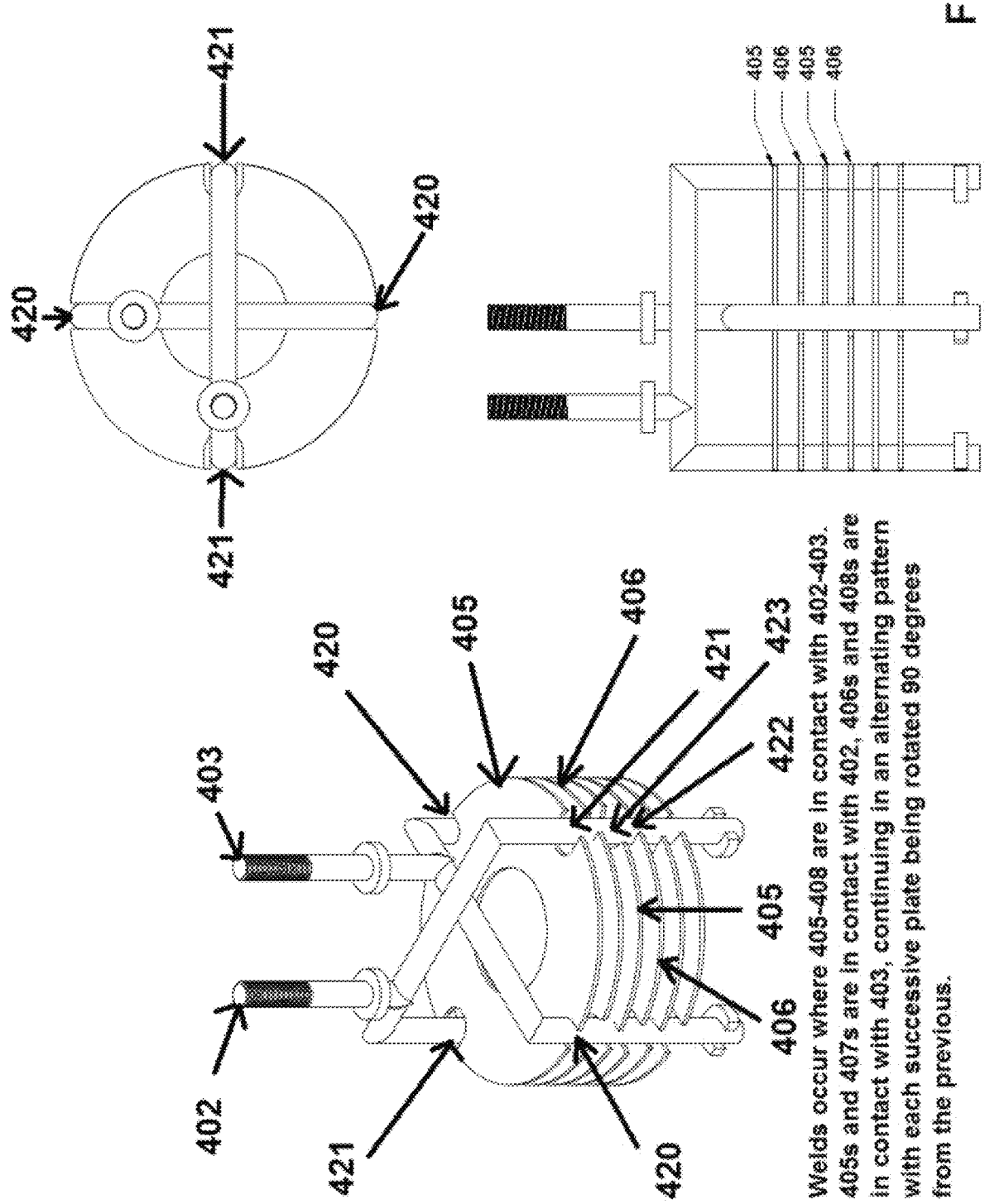

Referring again to FIG. 3, an electrocoagulation plate 300, referred to as a Trans-Channel Electrode (TCE), is depicted. The TCE 300 is preferentially fabricated from a conductive metal, a conductive metal alloy, a surface coated or impregnated with either a conductive metal or conductive metal alloy, and the like; examples of such a conductive metal or metal alloy include but are not limited to iron, steel, aluminum, and titanium. The TCE may alternatively be comprised of a conductive composite material such as those disclosed in U.S. Pat. Nos. 4,832,870 and 6,251,978 and the like. Referring to FIG. 4B, an electrical charge is provided to the TCE 300 such that an electrical current is developed between adjoining TCEs creating an electrical field which interacts with a quantity of contaminated fluid such as water for the purpose of removing some or all of the contaminants from the fluid.

Referring again to FIGS. 4A-4C, an electrocoagulation cell is depicted. The housing 404 of the electrocoagulation cell 400 is preferably comprised of a non-electrically conductive material such as polyvinyl chloride (PVC), chlorinated polyvinyl chloride (CPVC), polyvinylidene fluoride (PVDF), and the like. The housing may also be comprised of a material with an inner coating of a non-electrically conductive material such as PVC, CPVC, PVDF, and the like. Due to the pressures experienced within the cell, it is preferable to use a pressure rated housing such as a schedule 80 PVC or even heavier rating to prevent catastrophic failure of the system. The ends of the housing 404 are preferably flanged fittings to allow for fluid piping to be readily connected as an inlet and outlet to the electrocoagulation cell. Other means for capping the ends of the electrocoagulation cell such as threaded unions may also be used to allow for inlet and outlet plumbing to connect to the housing. Mounted inside the housing are a series of TCE pairs.

Unlike Linear and Serpentine electrodes, the bulk of the physical and chemical reaction which drives the electrocoagulation process does not take place on the outside edges of the TCEs, so the overall geometric shape of each TCE of a pair is not limited to something circular; however, because it is most commonly used stacked with other TCEs, a uniform shape should preferentially be selected, and a circular disk-like shape is preferential for the TCE as commercially available plumbing materials (such as PVC piping) are readily available, cheap, safe at the fluid pressures found within the cell, and effective at transporting fluids. In one preferred embodiment of the present invention the diameter of the TCE plate is about a nominal 6 inches. In another preferred embodiment of the present invention the diameter of the TCE plate is about a nominal 4 inches. In yet additional preferred embodiments of the present invention the diameter of the TCE plate is about a nominal 2 inches or a nominal 1 inch. By adjusting the electrical current applied to the TCEs, the TCE plate and the unit housing sizes can be well outside these preferred sizes for most industrial capacities as those skilled in the art are aware.

The TCE's 405, 406 are preferably attached within the housing via rods 402, 403. Other readily available means of mounting plates to a pipe housing may also be used to mount the TCE's to the housing.

The overall dimensions (height and width) of a cell containing an array of TCE's may vary depending on the specifics of the fluid to be treated via the electrocoagulation process. When treating lightly contaminated water, such as gray water, the water will not need much contact time with the TCE's, so either a small number of large TCEs or a large number of small TCEs may be used.

As the effectiveness of a TCE plate is dependent upon the surface area of edges on the plate rather than the thickness of the plate, the preferred TCE plate thickness may be chosen based on other criteria such as durability, ease of manufacture, availability of materials, and the like. Thicker plates require thicker, more expensive materials to make, are more expensive to machine, and are more difficult to assemble with other TCEs. A thicker TCE will be more durable over time, but its effectiveness has to do with the surface area of sharp edges it has which the fluid must flow past rather than plate thickness. TCE thickness is best regulated by what standard material thicknesses are available for sale and what material thickness can be easily machined. The preferred plate thickness is from about 0.050 inches through about 0.250 inches. Another preferred plate thickness is about 0.250 inches to about 1 inch. In a preferred embodiment the gap between adjacent TCE plates is about 0.25 inches to about 1 inch. In yet another preferred embodiment, the gap between adjacent TCE plates is about 0.4 inches to about 0.6 inches.

Figure 4C:
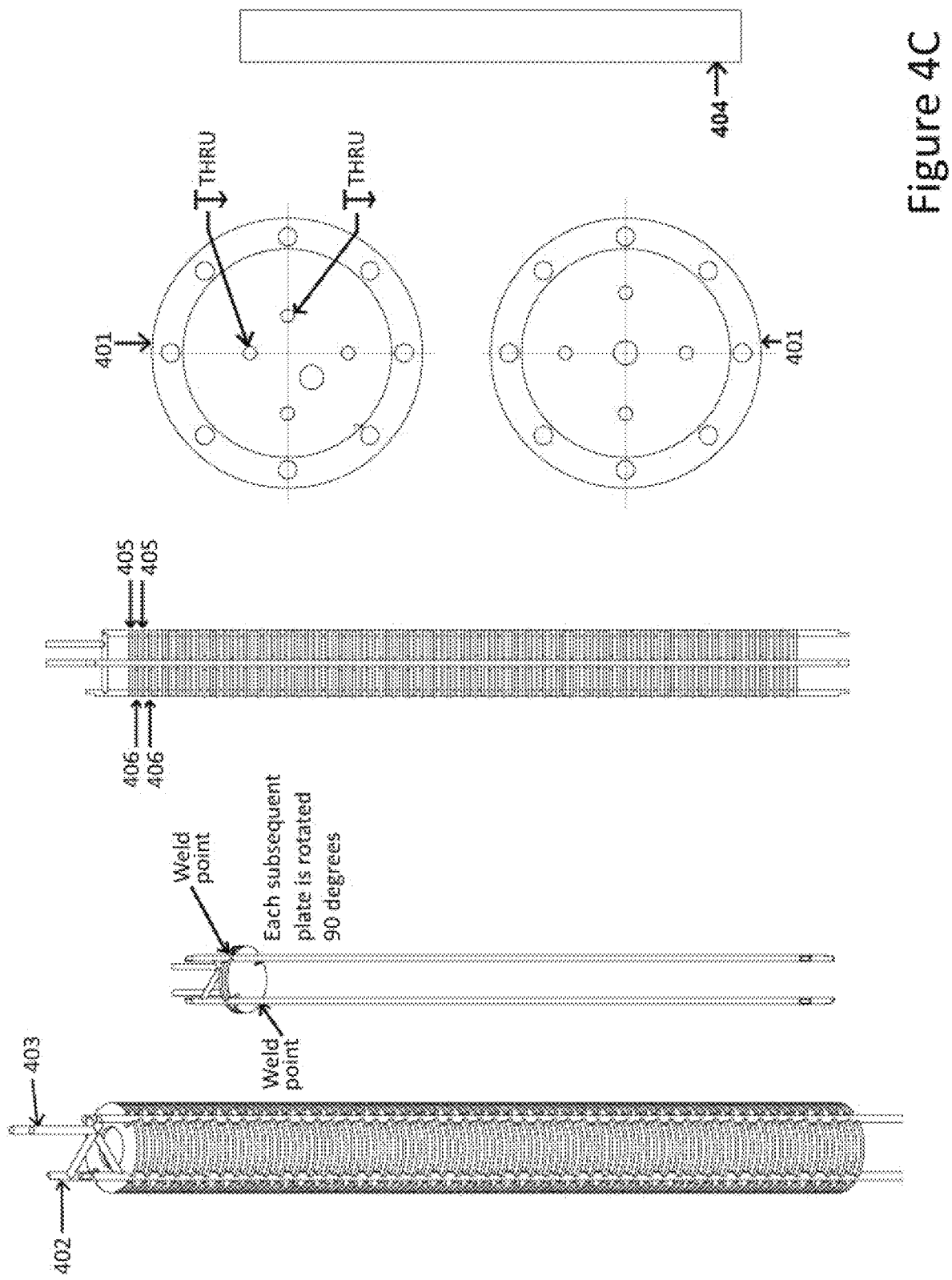
Figure 5A:
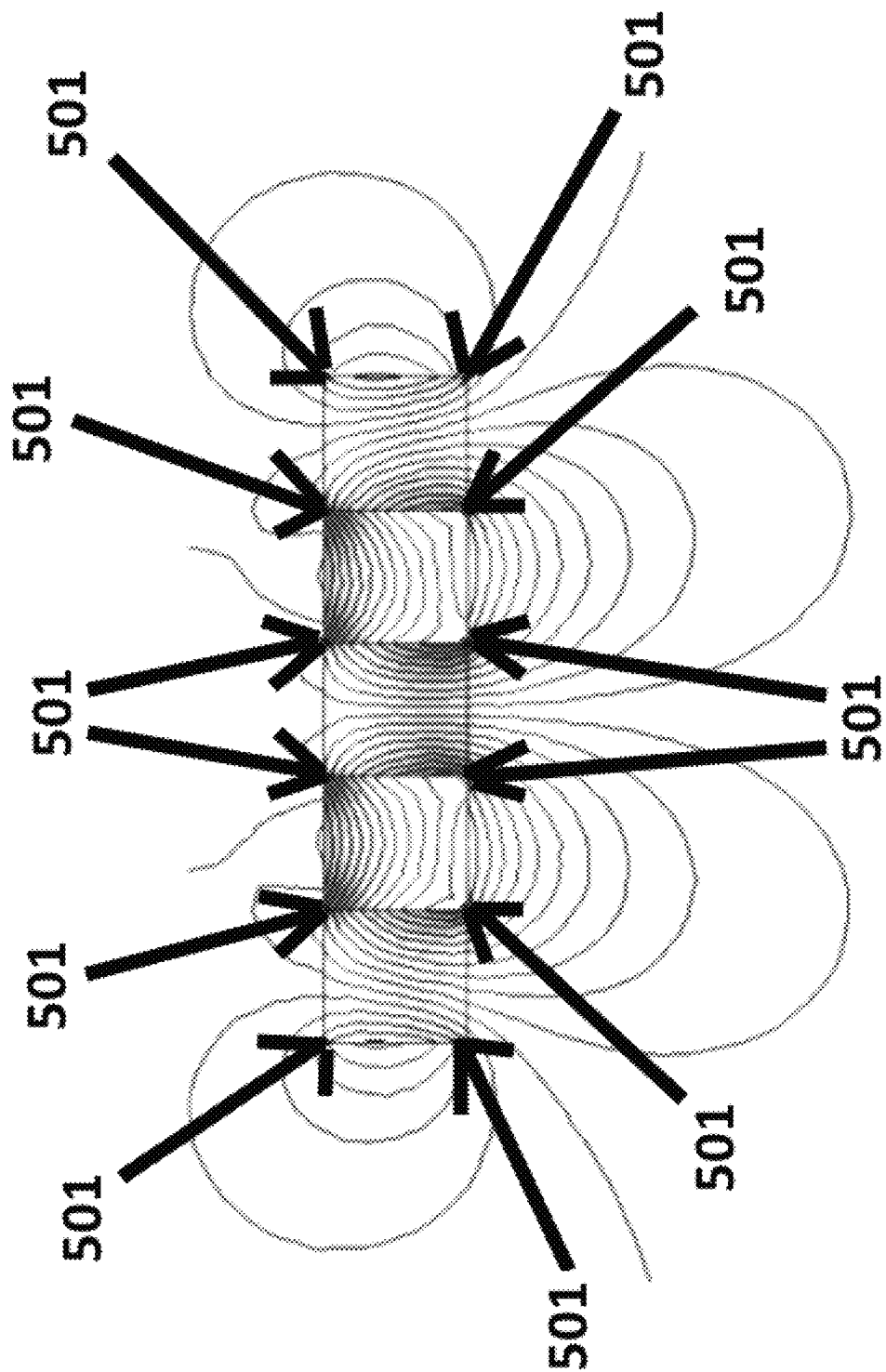
FIG. 5A depicts the electrical field around a TCE of the present invention.
Figure 5B:
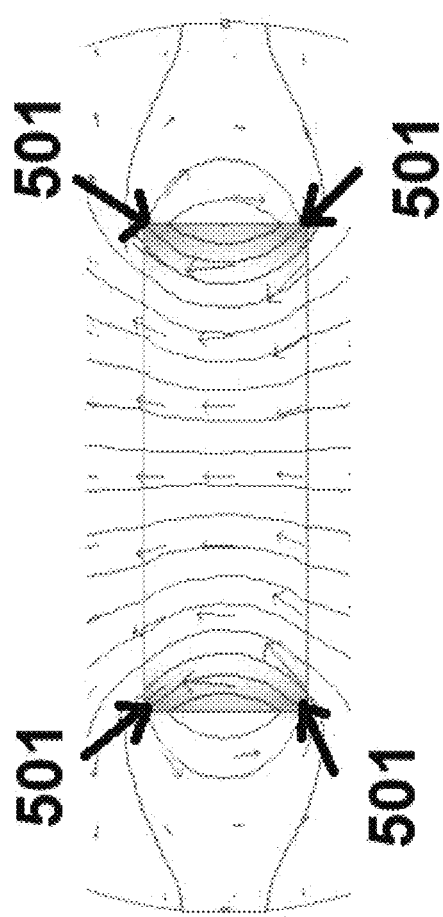
FIG. 5B depicts the electrical field around a plate of the prior art.

The TCE will preferably have cutouts at the outside edge to allow the TCE to be mounted to a support infrastructure (such as a dowel or rod made of the same material as the TCE) so that it can be included in a stack of other TCEs. As depicted in FIGS. 4B and 4C, the TCE may be mounted to the support infrastructure through any readily available means such as welding or spacers mounted upon the support infrastructure or the like. It is preferable for the TCE plates to be mountable at different spacings between adjacent plates to allow for adjustment to residence time of the fluid between and across TCE plates. In another preferred embodiment not depicted an insulator, comprised of commonly available insulator materials well known to those skilled in the art, may be placed in the gap between the rod and the plate which the rod bypasses. As depicted in FIG. 3, it is preferable for the cutouts 301, 303 in each TCE 300 to be hemispherical in shape and aligned in pairs oriented at opposing ends of a single vector traversing along the diameter of the TCE (for the preferred embodiment wherein the TCE is a circular disk). As those skilled in the art are aware, the precise quantity and shape of cutouts are determined by the means for mounting the TCEs to the cell housing of the electrocoagulation cells, but in the preferred embodiment of the present invention there are four such cutouts (two large cutouts 301 to allow for the rod to pass by without making contact with the plate, and two smaller cutouts 303 to allow for the rod to be connected to the plate), each aligned along the exterior of the disk and further aligned at 90 degrees to one another. Two of the TCEs are connected together to form a pair using conductive support infrastructure (such as a metal rod) attached to the TCEs at the cutouts 301, 303; one TCE will be attached at the first cutout to a rod which is connected to the output of an adjustable power source while a rod connected to the ground for that adjustable power source passes near a second cutout but remains unconnected to the second cutout; the other TCE in the pair is attached at the second cutout to the ground for the adjustable power source via a rod connected to the ground; while the output of the adjustable power source flows through a rod situated near the first cutout but unconnected to that first cutout. There is a certain amount of physical space (or gap) between the TCEs in the pair to prevent each TCE plate from directly contacting an adjacent TCE plate and to form a channel for water to flow between the adjacent TCE plates; the gap is achieved by mounting one device in the pair slightly further up on its support infrastructure than the other device. This gap may be maintained by the method of physically mounting the TCE plates to the rods such as welding or the like; the gap may also be maintained by using additional nonconductive spacers or the like to help reduce stress on the weld points. The rods are anchored together via a nonconductive material to keep the TCEs both from separating and from physically touching. The depth and width of the cutouts are preferably determined by the dimensions of the support infrastructure intended to be used to mount each TCE to the cell housing, wherein the gap between the TCE and the housing is minimized; for example, to mount a TCE to the housing using a dowel that is ⅜" in diameter, a recommended cutout would be 0.382" wide with a depth of 0.400". By minimizing the gap, the possibility of having fluid pass by an individual plate rather than across it and subsequently reduce the effectiveness of the water treatment is likewise minimized.

Figure 6:
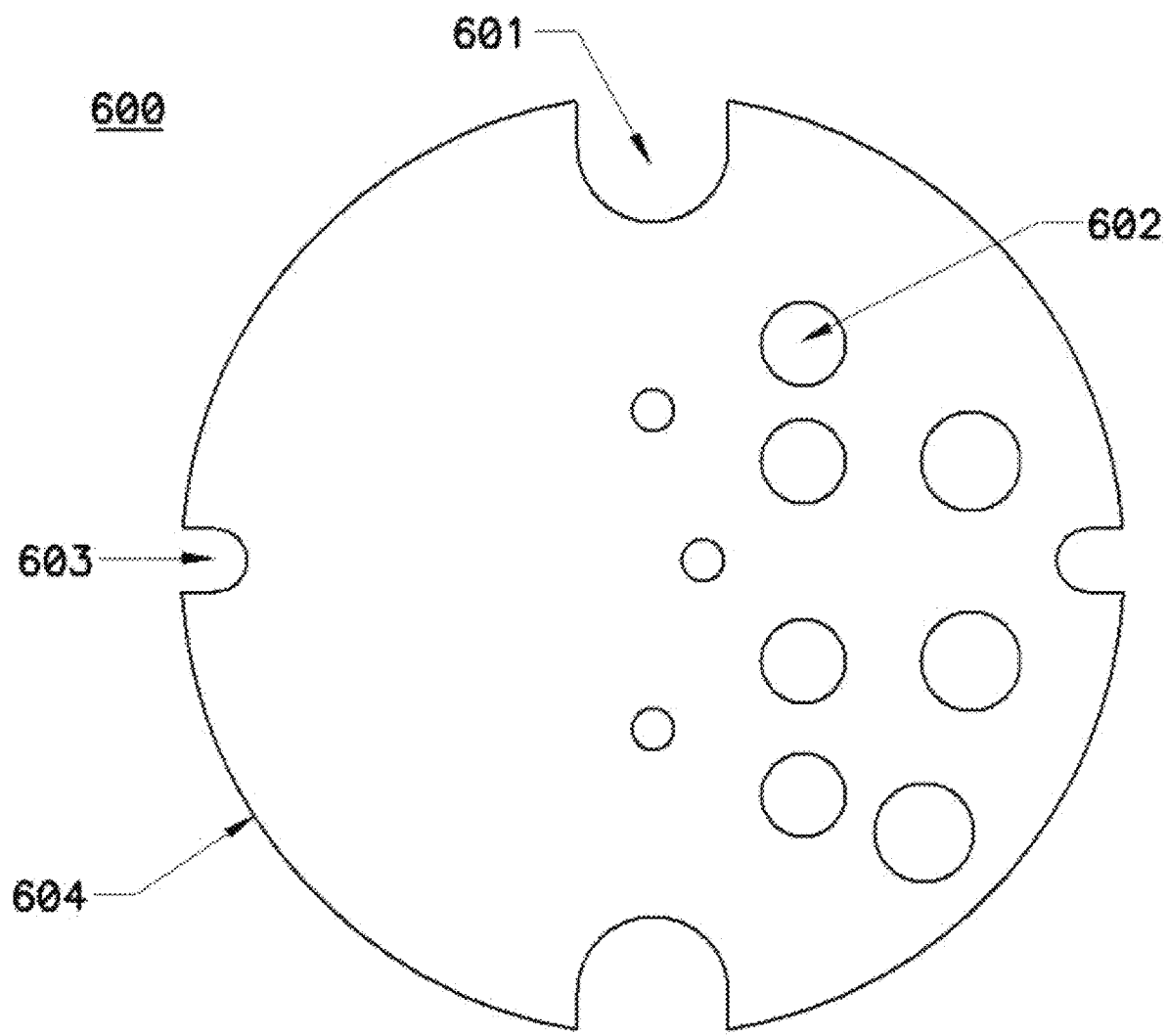
FIG. 6 depicts an overhead view of another embodiment of a single TCE of the device.

Referring now to FIG. 6 and the preferred embodiment of a TCE 600 of the present invention depicted therein, the TCE 600 may have a number of openings 602 through the main body of the plate away from the edge. The geometric particulars of the openings are not critical to the function of the TCE 600 provided that the sum total cross-sectional area of the openings 602, when added to the cross-sectional area of the cutouts beyond that blocked by the support architecture along the outside edge, do not exceed the cross-sectional area of the fluid flow to the TCE 600. As an example, with a 1 inch pipe supplying water to the TCE, the total cross-sectional area of all openings and cutouts through the TCE must not exceed 1 inch as exceeding 1 inch of cross sectional area could lead to excessive pressure drop within the gap ahead of the TCE plate and could also cause excessive cavitation which could both reduce the efficiency of the system and produce excessive wear of the system. In one preferred embodiment of the present invention the pressure drop through the cell is about 60 psi or less and more preferably the pressure drop through the cell is about 35 psi or less and yet more preferably is about 10 psi or less. In the preferred embodiments of the present invention the total cross-sectional area of all openings and cutouts in the TCE are slightly less than the cross-sectional area of the flow of water from the reaction cell inlet to the first TCE the fluid contacts. This allows for back pressure to be maintained throughout the cell. In the preferred embodiment depicted in FIG. 6, the openings 602 are circular. A circular shape was chosen due to the ease at creating the openings. Other shapes may also be used and for particular fluid and contaminant arrangements may be preferable as other shapes such as rectangular, hexagonal, and the like will have an increased ratio of edge perimeter to area of opening relative to that of a circular opening. Additional irregular shapes such as multipoint stars may also be used without avoiding the teaching of the present invention described herein.

Referring again to FIG. 2B, the openings through the face of each TCE 405, 406, 407 408 are oriented such that when another TCE is stacked above the first TCE in a cell, the openings aligned such that fluid flowing through the first TCE will not flow directly from one TCE via a path perpendicular to the TCEs directly through the next TCE. The openings are arranged such that a vector aligned along the vertical axis would not intersect openings in two consecutive TCE's. This forces the fluid to flow through the cell via a transchannel path (wherein by transchannel path, we refer to the flow of the fluid necessarily taking a path at times perpendicular to the bulk direction of flow vertically through the cell) and increases turbulence within the flow and thus increases the effectiveness of the process.

Referring to FIG. 4B, TCEs are most preferably used in pairs that form an electrocoagulation unit, with one TCE being connected to the adjustable power source being used to drive the TCE pair, and one TCE being connected to the ground for that same adjustable power source. The first TCE 405 is connected to the rod 403 connected to the adjustable power source and the second TCE 406 is connected to the rod 402 which is connected to the ground for that same adjustable power source (connections to the power source are not depicted though may be made through readily available means which are well known to those skilled in the art). It is preferable for the plates to be wired to the adjustable power source and ground such that the polarity of the plates may be reversed to reverse the flow of electricity and therefore the polarity of the electric and magnetic fields generated. It is preferable to reverse the polarity of an electrical current by initially reducing the current to 0 amperes and then reversing the polarity of the two electrodes such as by means of a programmable logic controller (PLC) and an H bridge. Any other readily available means to perform both functions would also be acceptable for use with the present invention. While the polarity reversal may happen at a wide range of frequencies, in one preferred embodiment the polarity is reversed about 10 times per second. In yet another preferred embodiment, the polarity is varied about 100 times per second. In yet another preferred embodiment, the polarity is varied at least once every 22 seconds. This reversal of polarity of the electrical charge provides two primary benefits to the operation of the system. The first is that corrosion at the TCEs is minimized as anodes and cathodes are swapped repeatedly prior to significant electrocorrosion or electroplating occuring at a particular electrode. The second is that coagulated contaminants possessing a particular charge that was drawing the contaminants towards an electrode are kept in an emulsion rather than settling on the electrode which further reduces corrosion at the electrode. The frequent charge reversals also inhibit the formation of films upon the electrodes which would reduce the efficiency of the electrocoagulation contamination removal. Said films may also prove to be corrosive to the electrodes or may induce corrosion at the electrodes, so inhibition of the formation of these films also beneficially extends the service life of the electrodes and TCEs. Contaminated fluid flows through the charged TCE and then the grounded TCE, closing the electrical circuit that drives the electrocoagulation process. It is preferable for both TCEs be comprised of the same material to inhibit corrosion on the TCE surfaces and edges.

It is preferable to maintain a voltage across the TCE pairs of about 60 volts or less. It is even more preferable to maintain a voltage across the TCE pairs of about 30 volts or less. It is also preferable to maintain a voltage across the TCE pairs of about 1.5 volts or greater. In a preferred embodiment a voltage across the TCE pairs of about 22 volts is maintained. In another preferred embodiment a voltage across the TCE pairs of about 4 to 5 volts is maintained.

In yet another preferred embodiment, the voltage across the TCE pairs is maintained at about 2.1 volts or less.

In one preferred embodiment it is preferable to maintain an electrical current across the plates of about 25 Amps on average and in another preferred embodiment it is preferable to maintain an electrical current across the plates of about 9 amps on average. Preferably, the current across the plates will run between about 0.75 amps/square inch and about 2 amps per square inch.

At particularly high voltages, system efficiency reduces as the electrical and magnetic fields at the region adjacent to plate openings is greater than that required to allow for and induce electrocoagulation and the fluid actually breaks down at a molecular level into the individual atomic components (such as in the case of water (H2O) hydrolyzing into hydrogen (H2) and oxygen (O2)).

As will be described further when the details of the cells in operation in an entire fluid treatment system are presented, the flow rate of fluid through the plate openings can be adjusted and will preferably be less than 6 feet per second and the pressure drop through the system cells will be less than 35 pounds per square inch and even more preferably will be less than about 10 pounds per square inch across the cells. In one preferred embodiment of the present system the residence time of fluid flowing through the system is about three seconds. In another preferred embodiment of the present system the residence time is about five seconds.

Typically, as is depicted in FIGS. 4B and 4C, more than two TCEs will be used together in the same electrocoagulation reaction cell. Generally speaking, the more TCEs that an electrocoagulation reaction cell possesses, the more effective will be contaminant removal. It is preferred that TCEs be used in stacks, in even-numbered quantities, alternating back and forth between TCEs which are connected to the adjustable power source that is being used to drive the stack and TCEs which are connected to the ground for that adjustable power source.

As the contaminants coagulate in the cell, there will be a minimal amount of gaseous hydrogen and oxygen formed due to electrical breakdown of individual water molecules. Maintaining the flow rate of fluid through the cell in an upward direction prevents an accumulation of these gases within the cell. This upward flowrate also prevents dissolved gases present in the influent stream from aggregating and forming either a vapor lock on the system or minimizing treatment efficiency by reducing the flow area of liquid throughout the cell. Maintaining the flow rate of fluid through the cell in an upward direction also helps to prevent coagulated contaminants from settling within the electrocoagulation reaction cell.

If the fluid to be treated is water, it is preferable for the incoming fluid to be at a temperature of at least 18 degrees Celsius. If the incoming fluid is at a cooler temperature than that, the influent should be preheated via readily available means. If the fluid to be treated is water, it is more preferable for the incoming fluid temperature to be of at least 25 degrees Celsius.

Once a quantity of contaminated water has been successfully treated with one or more pairs of TCEs, a settling period is needed. The length of this settling period varies, and can be made shorter by using a greater quantity of electrical energy and a greater quantity of TCEs to treat the contaminated water. During this period, compounds which are less dense than the contaminated water will float to the top of the water and denser compounds will settle to the bottom. The top of the contaminated water are skimmed with an appropriate apparatus and the compounds settled at the bottom are decanted out along with a small quantity of contaminated water leaving the treated water.

The TCE has several distinct embodiments, owing to alterations to the overall shape, overall dimensions, cutouts around the outside edges for support, openings for contaminated water to flow through, material thickness, and the material itself. Examples of some of these embodiments are documented in the remaining portions of the specification and the drawings which form a part of this disclosure. A full treatment skid including both optional inlet and outlet holding tanks will be described later in this specification.

Device

Referring again to FIG. 3, an overhead view of a representative TCE 300 is depicted. The TCE 300 may preferably be comprised of a circular disk 305 with a particular diameter. (As mentioned previously, the TCE may be formed into any readily machinable shape; a circular disk is chosen for the representative example due to the wide commercial availability of electrically conductive disks.) Along the outer edge 304 of the disk 305 are at least two cutouts 303 intended for attachment to support infrastructure, the cutouts are preferentially located at opposite ends of a single vector aligned along a diameter of the plate. The TCE 300 also has a multitude of openings 302 through the plate 305 through which contaminated water can flow and at which turbulence and electrical interactions can occur, and at least two larger cutouts 301 along the outer edge 304 of the disk 305; said larger cutouts 301 are intended to allow support infrastructure to pass by the device without contacting the disk (which would result in a short circuit) and also to allow further flow of contaminated water.

Referring to FIG. 6, a TCE 600 of another embodiment of the present invention is depicted. The TCE disk 605 has several openings 602 through the disk 605 and the openings 602 are of non-uniform dimensions relative to each other. As will be readily apparent to those skilled in the art, the specific dimensions of the TCE plates and the processing cells may be adjusted according to the tenets of the present invention.

METHODS OF USING THE DEVICE

Referring again to FIGS. 4A, 4B, and 4C, provided herein are some representative methods of preparing the device for use and treatment of a quantity of contaminated water.

In the preferred embodiment depicted therein, two TCEs 405, 406 are connected together to form a pair using conductive support infrastructure (such as metal rods 402, 403) attached to the TCEs at the cutouts; one TCE 405 will be attached at a first cutout to rods 403 which are connected to the output of an adjustable power source while rods 402 connected to the ground for that adjustable power source pass near a second cutout but remain unconnected to the second cutout; the other TCE 406 in the pair will be attached at the second cutout to rods 402 attached to the ground for the adjustable power source and rods 403 connected to the output of the adjustable power source pass near the first cutout but remain unconnected to the first cutout. There is a certain amount of physical space (or gap) between the TCEs 405, 406 in the pair to prevent each TCE plate 405, 406 from directly contacting an adjacent TCE plate 406, 405 to form a channel for water to flow between the adjacent TCE plates 405, 406; the gap is achieved by mounting one device in the pair slightly further up on its support infrastructure than the other device. The rods remain anchored in place by preferably having the outer perimeter of each rod adjacent to the inner diameter of the tubing forming the electrocoagulation unit outer shell. In this representative embodiment, there is a pair of conductive bars that go across above the TCE plates that connect the 2 anodes and also connects the 2 cathodes. As those skilled in the art are aware other methods of completing an electrical circuit are available and using another means to complete the circuit do not avoid the teachings of the present invention. The adjustable power source is activated and contaminated water is then passed through openings, completing the electrical circuit between the two TCEs. Turbulence generated by passing the water through multiple small openings, as well as turbulence generated by forcing the water to move through a crisscrossing path through each TCE in the TCE pair, combines with the electrical energy to augment the electrocoagulation process. The pressure drop is maintained essentially consistent across the TCE by placing larger holes through the TCE disk towards the outer edge of the TCE and smaller holes through the TCE disk towards the center of the TCE. The contaminated water leaves the TCE pair and are preferably collected in a holding tank, where less dense contaminants collect at the top of the water and are skimmed off, and more dense contaminants collect at the bottom of the water. These heavier contaminants may be removed via processes such as decanting.

In the preferred embodiments of the present invention from FIG. 3, a stack of a multitude of TCE pairs 305, 306, 307, 308 are connected together in a manner comparable to that just described, with roughly half of the devices connected to the output of the adjustable power source and the remainder of the devices connected to the ground for that adjustable power source. The most efficient arrangement is for every other device to be connected to the output of the adjustable power source. There will be a certain amount of physical space between the individual devices. Operation of a cell containing such a stack of TCE plates would be similar to that of a cell containing a single pair of TCE plates.

In a preferred embodiment of the present invention a pair of TCEs 405, 406 are connected together in a fashion similar to the above and placed inside of a non-conductive pipe suitable for carrying a stream of contaminated fluid for treatment. The stream of contaminated fluid is then directed to flow through the pipe, and the fluid is treated via the process described previously.

In a preferred embodiment of the present invention a stack of more than two TCEs 405, 406, 405, 406 (and as depicted in FIG. 4C a multitude of TCEs may be included in a reaction cell) as previously described is placed inside of a non-conductive pipe suitable for carrying a stream of contaminated water for treatment. A stream of contaminated water is then directed through the pipe, at which point the stack is used as described above.

Electrocoagulation Skid

Figure 7:
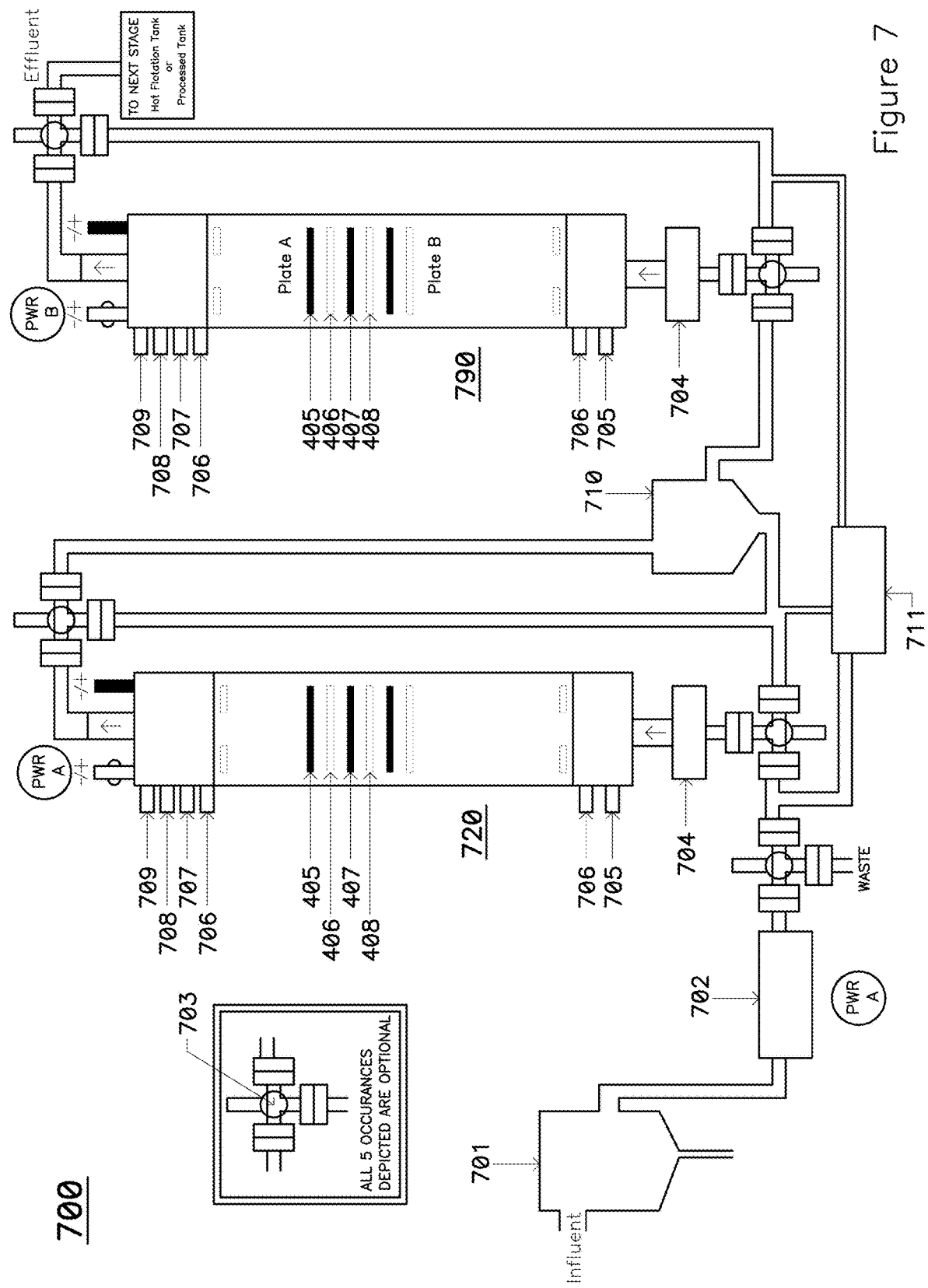
FIG. 7 depicts an electrocoagulation system.
Figure 8:
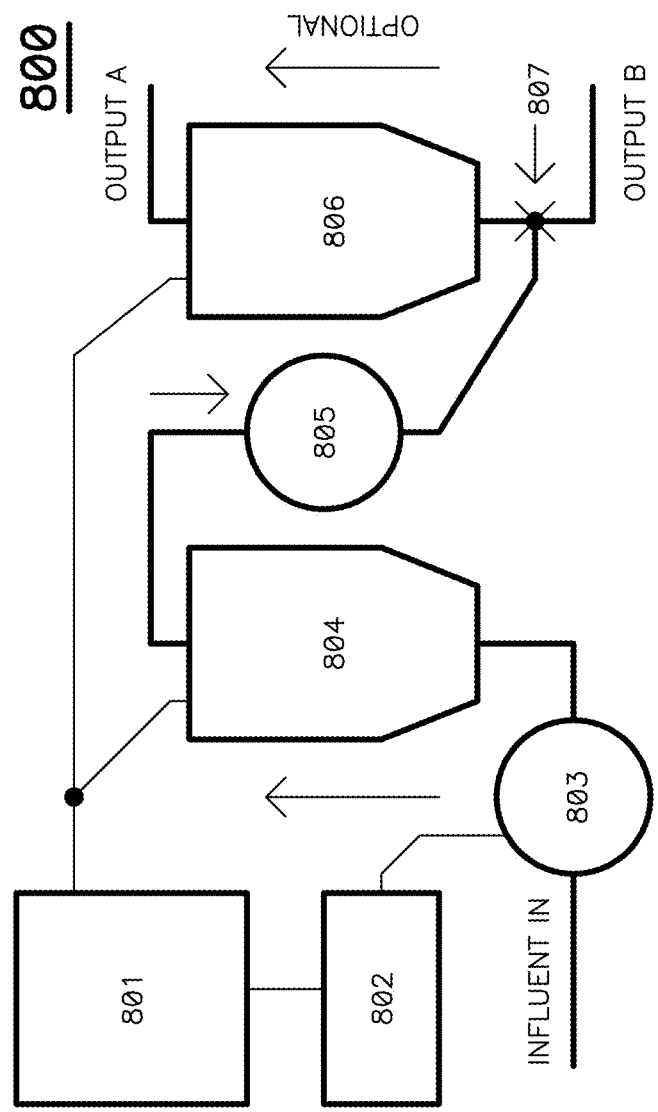
FIG. 8 depicts a control matrix for an electrocoagulation system.

Referring to FIG. 7 and FIG. 8, a preferred embodiment of an electrocoagulation system 700 making use of two electrocoagulation cells is depicted. Fluid flows into the system where it may optionally be stored temporarily in a holding tank (slug filter) 701. There also may preferably be an optional pretreatment filter system included before the holding tank to remove large and/or easily removed solids from the influent to the system. The fluid from the holding tank 701 then flows into the bottom of a first electrocoagulation cell 720 via a pump 704 which is preferably a variable speed pump. The fluid flowing from the holding tank 701 may optionally flow through a preliminary pump 702 which is preferably a variable speed pump. The fluid flows from the pump 704 into the bottom of a first electrocoagulation cell aligned in a vertical arrangement discharges through the top of the first electrocoagulation cell and then flows into the bottom of a second electrocoagulation cell 790. This second electrocoagulation cell 790 is also aligned in a vertical arrangement. Fluid discharging from the second electrocoagulation cell 790 may be collected in a holding tank. The optional holding tank is arranged as a decanting vessel so that solids may precipitate to the bottom of the tank and then be removed from the tank via decanting. The solids and liquid decanted from the holding tank may be collected for further processing. The remaining treated liquid may also undergo further treatment or may be used as feed stock for items such as fracking fluid, watering lawns, filling ponds, watering crops, influent to drinking water treatment plants and the like depending upon the degree of treatment obtained and the initial fluid contamination properties. The fluid held in the effluent holding tank may be further treated via systems such as an oil water separator, a tertiary treatment method, or the like.

Preferably, the first cell is comprised using mild steel plates or the like and the second cell is comprised of aluminum plates or the like.

The electrocoagulation unit may optionally include a heat shield to cover the unit which would keep the elements such as direct sunlight, rain, snow, and the like off the individual components of the unit. The electrocoagulation unit is preferably mounted on a skid to allow for portability of the unit. The optional heat shield may be mounted to the upper portion of the skid.

The electrocoagulation skid control matrix 800 is comprised of a brain box 802; magnetic control amplifiers 801 with feedback, having the ability to drive the TCE reaction chambers 804 and 806, having the ability to reverse the polarity of 804 and 806, having the ability to drive 804 and 806 at full power or reduced power using a modulation scheme, and having the ability to sense basic electrical faults and deactivate power to 804 and 806 and report the issue to the brain box 802; the brain box 802, having the ability to monitor and control the function of 801, having the ability to monitor and control the function of pump apparatus 803, having the ability to monitor the state of the system through a series of OPTIONAL sensors (fluid temperature 705, fluid flow 706, fluid pressure 707, voltage 708, current 709, and chemical analysis 711), having the ability to report the status of the system via a display 1000 or via a web site made available via the Internet that would show current configuration and operating conditions; a pump apparatus 803 used for flow control into the system; a first TCE reaction chamber 804 constructed of material such as steel; a second TCE reaction chamber 806 constructed of a material such as aluminum; a valve 807 to allow maintainence to the system and to limit processing of the fluid to 804, removing 806 from the process; and an optional storage tank 805 which may be installed to collect the clean effluent from the system.

Figure 9:
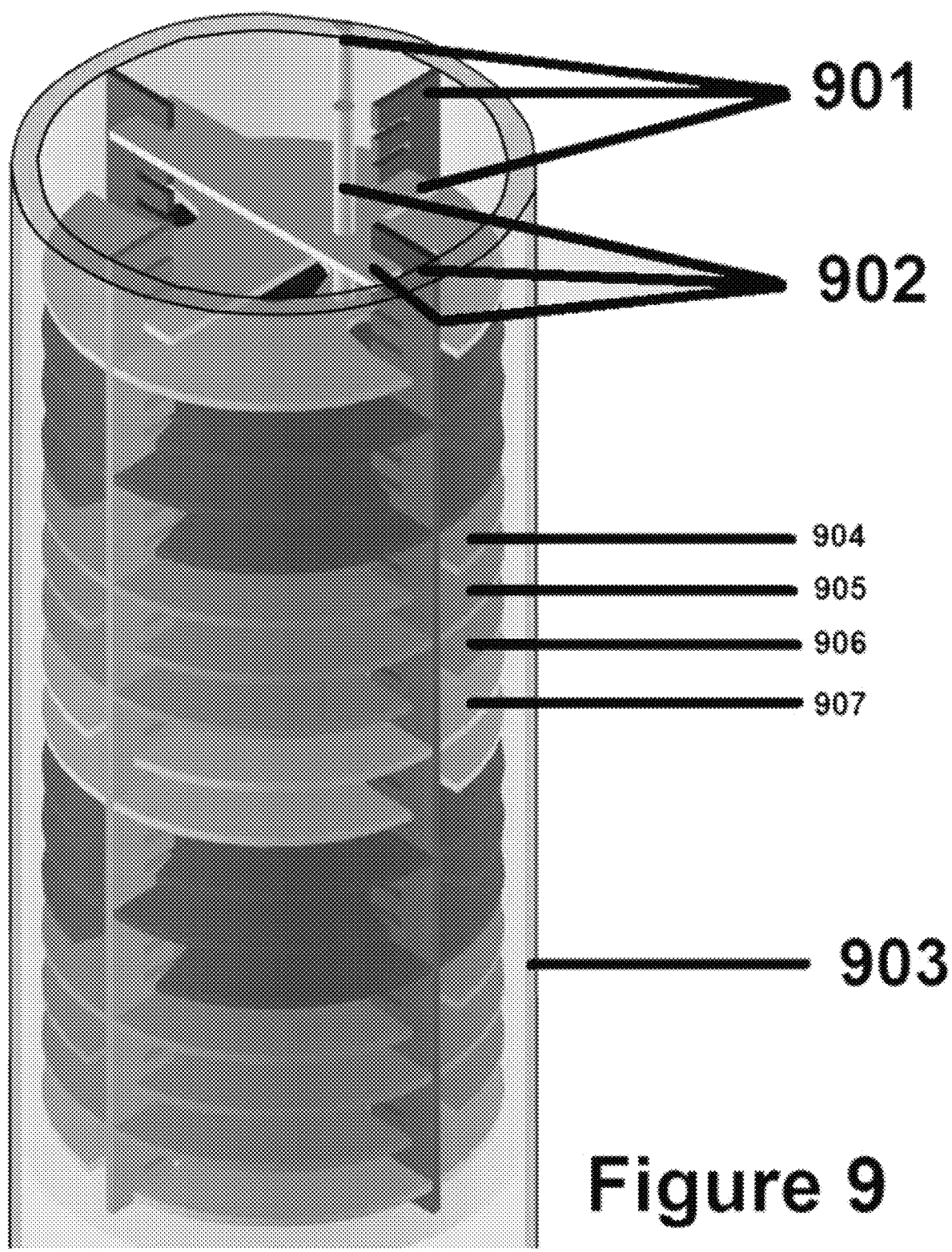
FIG. 9 depicts another embodiment of a single TCE of an electrocoagulation device.

The brain box is configured to monitor the current profile across the reaction chambers. It is used to control solid state relays when adjusting the polarity of the electrical flow. This is an advancement over the prior art systems which make use of mechanical relays. The current system can be set up to either ramp the current down and then reverse the polarity and then ramp the current back up, or simply reverse the polarity while there is high current flow. The brain box 802 is configured to act as a reporting center and is automated to supervise overall system status allowing for the adjustment of the process to achieve a consistent quality of fluid treatment. The brain box 802 may further provide an automated control given certain presets; may provide a decision-making functionality to adjust the process as conditions change and may monitor safety and provides for controlled shutdown of the system. The brain box may also be configured to allow for a remote auditing capability for skids located at remote locations. This remote auditing may communicate situational awareness alerts via email or remote dial out features. As should be readily apparent to those skilled in the art, the system may also be put into a manual operational mode. The brain box may optionally be equipped with connections to in-line sensors (not depicted) which can allow for operation of a chemical analysis module and may also optionally be equipped with connections to an accelerometer to measure fluctuations in the flow rate allowing for the flow rate to be adjusted via the variable speed pump to reduce items that might reduce efficiency and overall service life such as vibration and cavitation The process control of the system is preferably set to optimize the electrocoagulation cell depicted in FIG. 9. The electrocoagulation cell of FIG. 9 is similar to that of the electrocoagulation cell 200 except the electrocoagulation cell of FIG. 9 is equipped with grooved electrical plates 901, 902 rather than the rods 201, 202 of FIG. 2. These electrical plates 901, 902 have grooves cut into them to allow for the spacing between plates 904, 905, 906, 907 to be set precisely in the plate column. The electrical plates 901, 902 perform the same function as the rods 201, 202 of the other assembly and also only contact every other TCE plate to allow for alternating plates to act as anodes and cathodes.

Figure 10:
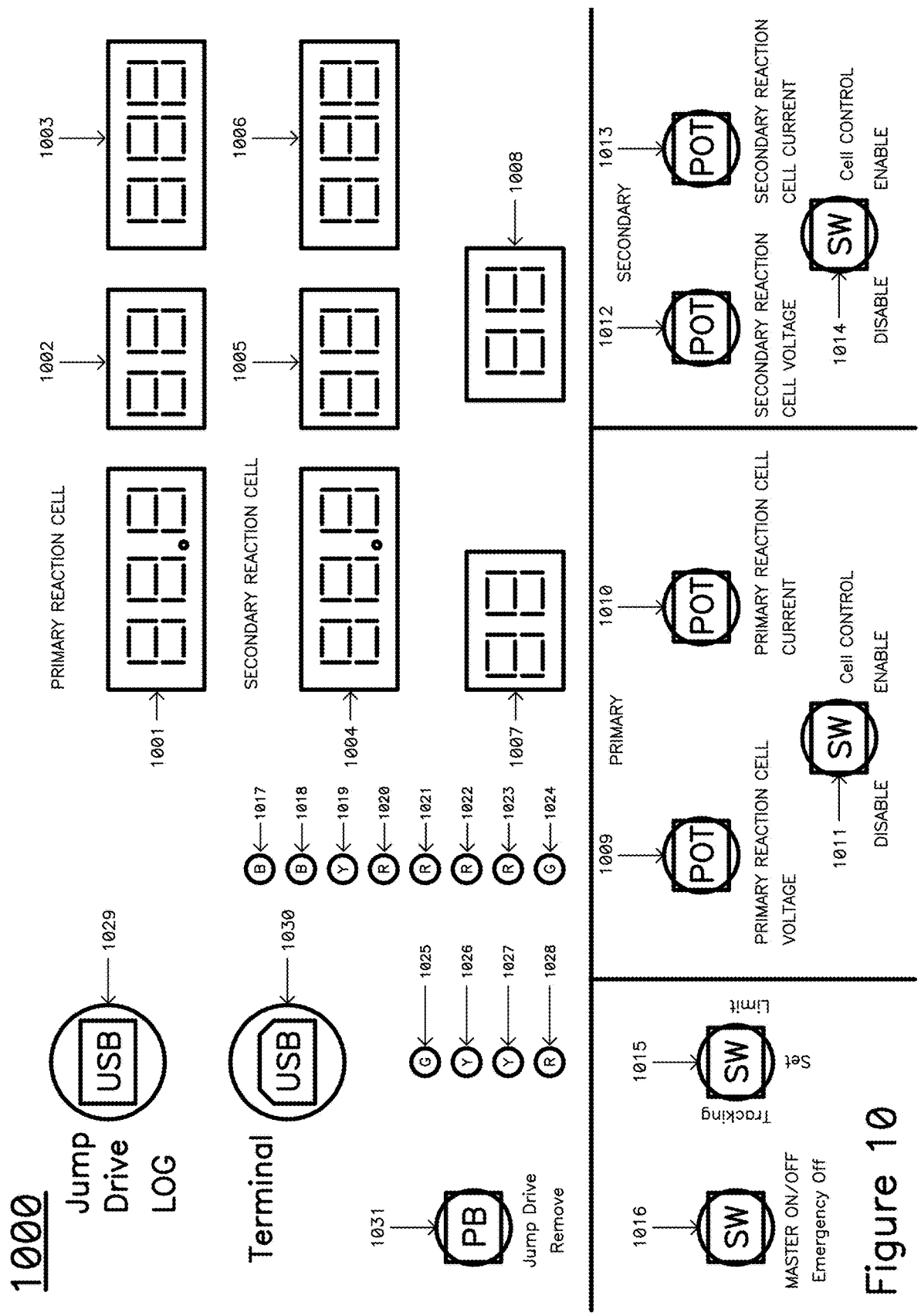
FIG. 10 depicts an exemplary view of a representative system control interface.

The electrocoagulation unit preferentially comprises two control panels. A representative exemplary example of the first control panel 1000 for use with the electrocoagulation unit is depicted in FIG. 10. The first control panel 1000 contains the controls necessary to allow for polarity reversal of the electrical charge on the individual TCE plates within each cell. Preferably solid state relays are used to provide for the polarity reversals. In the representative example of the first control panel 1000 depicted in FIG. 10, several process control variables may be observed and recorded including: a first reaction chamber voltage display 1001 showing the approximate voltage of the electrical power supplied to first TCE reaction chamber (refer to 804) in the pair of cells currently being monitored; a first reaction chamber amperage display 1002 showing the approximate amperage of the electrical power supplied to first TCE reaction chamber (refer to 804) in the pair of cells currently being monitored; a first reaction chamber wattage display 1003 showing the approximate wattage of the electrical power introduced to the fluid traveling through the first TCE reaction chamber (refer to 804) in the pair of cells currently being monitored on a per-gallon basis; a second reaction chamber voltage display 1004 showing the voltage of the electrical power supplied to second TCE reaction chamber (refer to 806) in the pair of cells currently being monitored; a second reaction chamber amperage display 1005 showing the amperage of the electrical power supplied to second TCE reaction chamber (refer to 806) in the pair of cells currently being monitored; a second reaction chamber wattage display 1006 showing the approximate wattage of the electrical power introduced to the fluid traveling through the second TCE reaction chamber (refer to 806) in the pair of cells currently being monitored on a per-gallon basis; flow rate display 1007 showing flow rate of fluid traveling through the TCE reaction chamber pair currently being measured, in gallons per minute; reaction pair indicator display 1008 indicating (by number) which TCE reaction chamber pair is being monitored on 1001 through 1007.

Exemplary first control panel 1000 further provides manual controls to adjust the operation of the system including a first reaction chamber voltage control knob 1009 for manual adjustment of the approximate voltage of the electrical power supplied to first TCE reaction chamber (refer to 804) in the pair of cells currently being monitored; a first reaction chamber amperage control knob 1010 for manual adjustment of the approximate amperage of the electrical power supplied to first TCE reaction chamber (refer to 804) in the pair of cells currently being monitored; a first reaction chamber selector switch 1011 to enable or disable manual adjustment of the electrical power supplied to first TCE reaction chamber (refer to 804) in the pair of cells currently being monitored; a second reaction chamber voltage control knob 1012 for manual adjustment of the approximate voltage of the electrical power supplied to second TCE reaction chamber (refer to 806) in the pair of cells currently being monitored; a second reaction chamber amperage control knob 1013 for manual adjustment of the approximate amperage of the electrical power supplied to second TCE reaction chamber (refer to 806) in the pair of cells currently being monitored; a second reaction chamber selector switch 1014 to enable or disable manual adjustment of the electrical power supplied to second TCE reaction chamber (refer to 804) in the pair of cells currently being monitored; a manual/automatic mode switch 1015 to allow the user to select between an automated or manually controlled process (using controls 1009 through 1014); and a master power switch 1016 to allow the user to turn the system as a whole on or off.

The representative first control panel 1000 further includes visual indicators to allow an operator to know when components are energizes such as a first reaction chamber visual indicator 1017 to indicate that the first TCE reaction chamber (refer to 804) in the pair of cells currently being monitored is energized; a second reaction chamber visual indicator 1018 to indicate that the second TCE reaction chamber (refer to 806) in the pair of cells currently being monitored is energized; a brain box visual indicator 1019 to indicate that the brain box governing the system is functional; a low flow rate visual indicator 1020 to indicate that the rate at which the fluid is flowing through the pair of cells currently being monitored is too low; an extreme temperature visual indicator 1021 to indicate that the temperature of the pair of cells currently being monitored is either too high or too low; a low voltage indicator 1022 to indicate that the voltage measured in the pair of cells currently being monitored is too low; a high voltage visual indicator to indicate that the voltage measured in the pair of cells currently being monitored is too high; an operating status visual indicator 1024 to indicate that the system is running; a power on visual indicator 1025 to indicate that the system has power; a remote access status indicator 1026 to indicate that a good communications channel has been established to the system (via Ethernet, a local area network (LAN), a wide area network (WAN), or the like); a data transmission visual indicator 1027 to indicate that data is being transmitted over the communications channel; and a communications error visual indicator 1028 to indicate that some kind of error has occurred on the communications channel.

Figure 11:
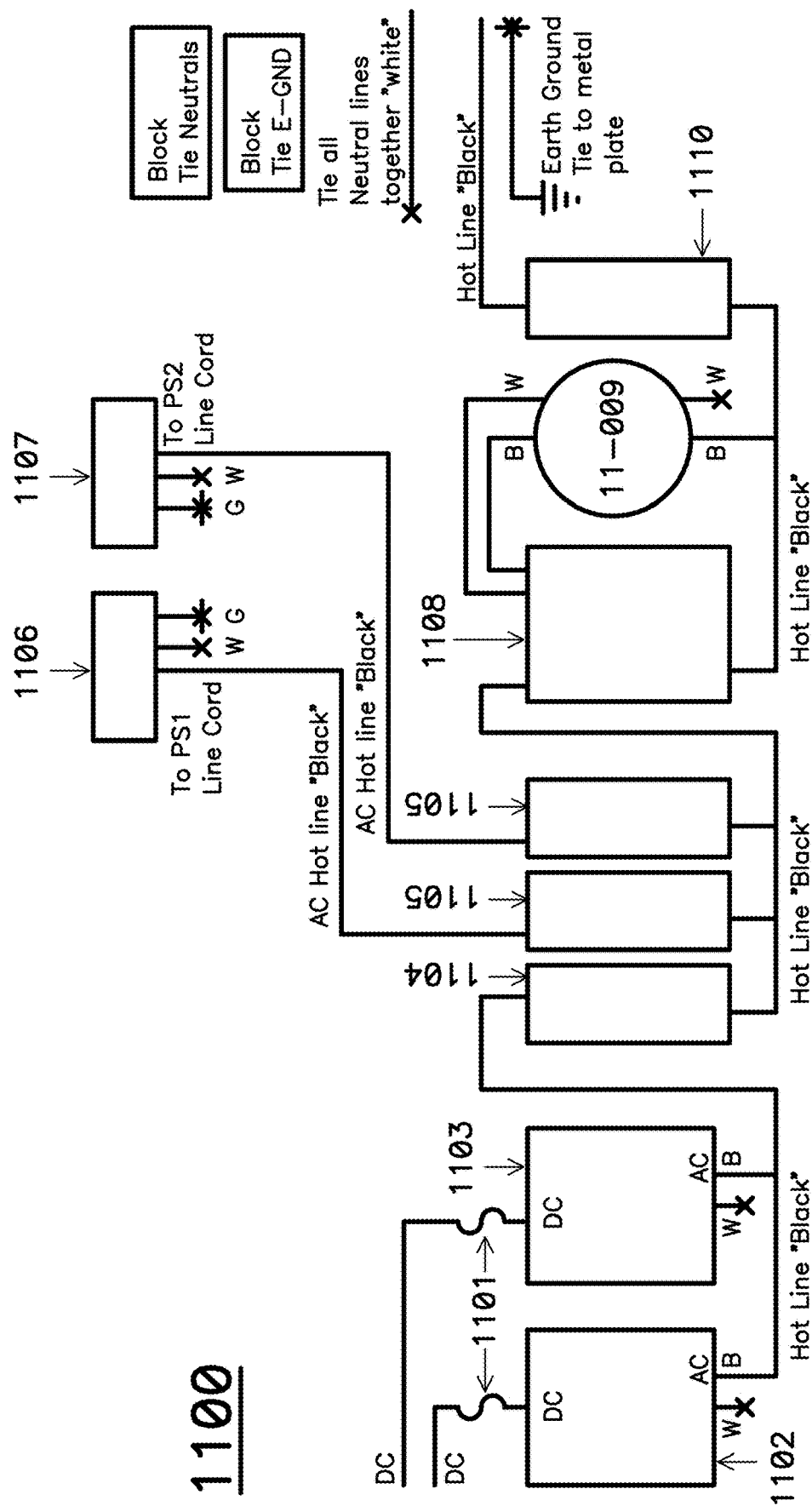
FIG. 11 depicts an exemplary view of a representative AC power distribution scheme.
Figure 12A:
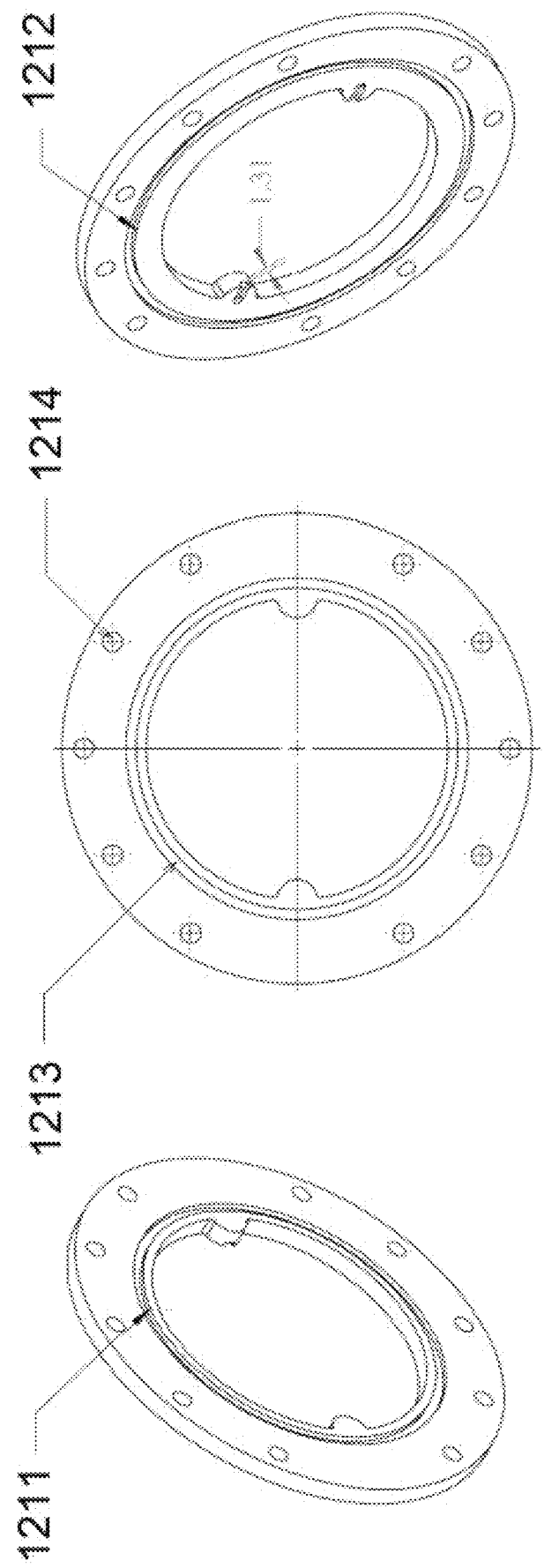

The first control panel 1000 may also have additional connection ports such as an external storage device connection port 1029 for connection to an external storage device and a communications connection port 1030. The representative example first control panel 1000 depicted further provides a button 1031 eject/disconnect external storage. All these indicators and functional buttons/switches are merely representational as those skilled in the art are aware and other formats for controlling the system may be used without teaching around the present invention. A representative exemplary example of the second control panel for use with the electrocoagulation unit is depicted in FIG. 11. The second control panel preferably provides for power supply (220 Volt and 40 Amp service is preferable in one preferred embodiment) and power controllers. The representative exemplary second control panel depicted includes an alternating current (AC) power distribution block 1000; a slow blow fuse 1101; a first power supply 1102 for AC input and direct current (DC) output; a second power supply 1103 for AC input and DC output; a first circuit breaker 1104; a second circuit breaker 1105; a first AC power supply 1106 which supplies AC power for the first TCE reaction chamber 1106; a second AC power supply 1107 which supplies AC power for the second TCE reaction chamber; a relay contactor 1108; an emergency off switch 1109; and a main circuit breaker 1110. In one preferred embodiment of the present invention the for the slow blow fuse 1101 is a 2 ampere (A) fuse; the first circuit breaker 1104 is designed to trip above 6A; the second circuit breaker is designed to trip at 10A; and the main circuit breaker 1110 is designed to trip at 20A. Again, this particular panel design is merely representational as those skilled in the art are aware and a panel including features such as a graphical user interface, a touchscreen, or the like may also be used.

In the embodiment depicted in FIGS. 10 and 11, the pump is preferably about a 10 kgal/hr pump and the flow rate of fluid to the system is preferably about 4 kgal/hr. The pump may preferably be provided with a variable speed motor. The pump may optionally be provided with a servo controller to allow for greater adjustment of the fluid flow rate through the system.

The effluent line from each cell is preferably teed so that a portion of the effluent may be directed back to the inlet to the first holding tank or a prior treatment cell. This teed line also allows for instrumentation such as pressure gauges, temperature gauges, pH probes, conductivity probes, turbidity probes, and the like to be installed into the line.

Referring to FIG. 10, a preferred embodiment of an exemplary control panel for the electrocoagulation skid depicted in FIG. 9 is depicted. As those skilled in the art are aware, there are myriad ways to lay out the components of a control panel, and designing a control panel that is not laid out similarly to that control panel 1000 depicted does not teach away from the present invention.

The controls for the skid provide: a diagnostics capacity which allows for a review of the status of the system and make adjustments to parameters that seem inappropriate; a calibration capacity to set the ideal running parameters for the system and allow it to run automatically; and also process optimization whereby parameters may be adjusted until ideal running parameters are found for a particular stream of fluid to be treated.

The control algorithm allows for automatic adjustment or manual override of the voltage, current density, and pulse width modulation (PWM)/dwell time and polarity reversal time and flow rates, clarity, pH, pressure, flow, conductivity, temperature, and the like. Ideal conditions are generally a pH of 7, temperature of 22 degree Celsius, and the rest of the equation establishes the minimal current density needed to start the treatment reaction (combination of voltage, current, fluid velocity, all versus the surface area of your plates).

The algorithm allows for the process to operate at optimal running parameters regardless of how contaminated the water is.

Similarly, per previous description, the control scheme provides several alarms—low voltage, no voltage, high voltage, low flow, no flow, and the like.

Referring to FIG. 11, an exemplary AC power distribution block 1100 for the electrocoagulation skid depicted in FIG. 8 is presented. The components of the one particular exemplary AC power distribution block include slow-blow fuse 1101; first power supply with AC input and DC output 1102; second power supply with AC input and DC output 1103; first circuit breaker 1104; second circuit breaker 1105; AC power supply for first TCE reaction chamber 1106; AC power supply for second TCE reaction chamber 1107; relay contactor 1108; emergency power toggle switch 1109; and a third main circuit breaker 1110.

Referring to FIGS. 12A-12D and the preferred embodiment depicted therein, a reaction chamber 1200 is depicted. This reaction chamber is similar to that of the reaction chamber 200 described previously. The reaction chamber 1200 additionally contains nonconductive rings 1210 interspersed between the TCE plates 305, 306, 307, 308. These nonconductive rings 1210 allow for a predetermined distance to be spaced between the TCE plates. Each nonconductive ring 1210 preferably has a lower gasket groove 1211 and an upper gasket groove 1212 cut into the ring via readily available means. Into each gasket groove a gasket ring 1213 may be placed to keep fluid to be treated from exiting the mixing chamber via the outer diameter of the mixing chamber. The thickness of the nonconductive ring 1210 may be sized to obtain the desired depth of the mixing chamber. The nonconductive ring 1210 is further preferably equipped with orifices 1214 near the outer diameter of the nonconductive ring to allow the rings 1210 and plates 300 to be securely connected via bolts or other similar means.

As those skilled in the art are aware, the controls of the system may be configured to be stored in alternative containments and providing for the controls to be stored in a single containment or in a multiple of three or more containment panels is consistent with the teachings of the present invention.

In a preferred embodiment of the present invention, the TCEs of which are depicted in FIGS. 12A-12D at least one TCE pair (305 & 306, and 307 & 308) is placed inside of a conductive pipe 1202 and anchored using a non-conductive method, such that the device is electrically isolated from the pipe. The conductive pipe 1202 is then placed inside a non-conductive structure suitable for carrying a stream of contaminated water for treatment. Non-conductive spacer elements 1210 are placed between each TCE element 305, 306, 307, 308. Each non-conductive spacer element 1210 has a front gasket ring channel 1212 and a back gasket ring channel 1211 routed into opposing surfaces of the spacer element 1210. Each spacer element 1210 further has a myriad of mounting orifices to provide for secure mounting of the spacer element 1210 between the TCE pairs. The TCE pair is connected to the output of an adjustable power source, and the conductive pipe is connected to the ground of the adjustable power source. A stream of contaminated water entering the reaction cell 1202 at the inlet 1201 and exiting through the outlet 1203 is then directed through the pipe at which point an electrical circuit is completed between the conductive pipe and the TCE pair via the contaminated fluid and the present invention is used as described above.

The voltage and current generated by the adjustable power source, the rate of the flow of the contaminated fluid, the number of cells used, the size and shape of the cells used, the cutouts around the edge of the TCEs, the openings in the TCEs and the gap between the TCEs are all subject to change based on the specifics of the contaminated fluid and the treatment level desired. The magnetic field 208 around an opening 209 in a TCE is depicted in FIG. 12B. Contaminated fluid requiring a greater degree of contaminant removal via electrocoagulation treatment could be treated by adjusting the setup of the cell by adjusting any combination of the following parameters: reducing the gap between TCEs; reducing the fluid flow rate thereby increasing residence time of the fluid in the cell; increasing the quantity of TCEs in a stack; and generating higher levels of voltage, current, or both via the adjustable power source, or adding an electrolyte/electrolyte pair to the fluid (such as salt) to increase the conductivity with the fluid. Contaminated fluid with a greater viscosity than relatively pure water could be treated using a cell wherein there is a larger gap between TCEs, TCEs with additional openings through the TCEs, or both. Pure water is nonconductive electrically, so when the contaminated fluid to be treated is moderately contaminated water, the voltage required to treat the water would be higher than would be necessary to treat more highly contaminated water. Increasing the current through the system generally reduces the necessary residence time required to allow for contaminants to coagulate.

Figure 13:
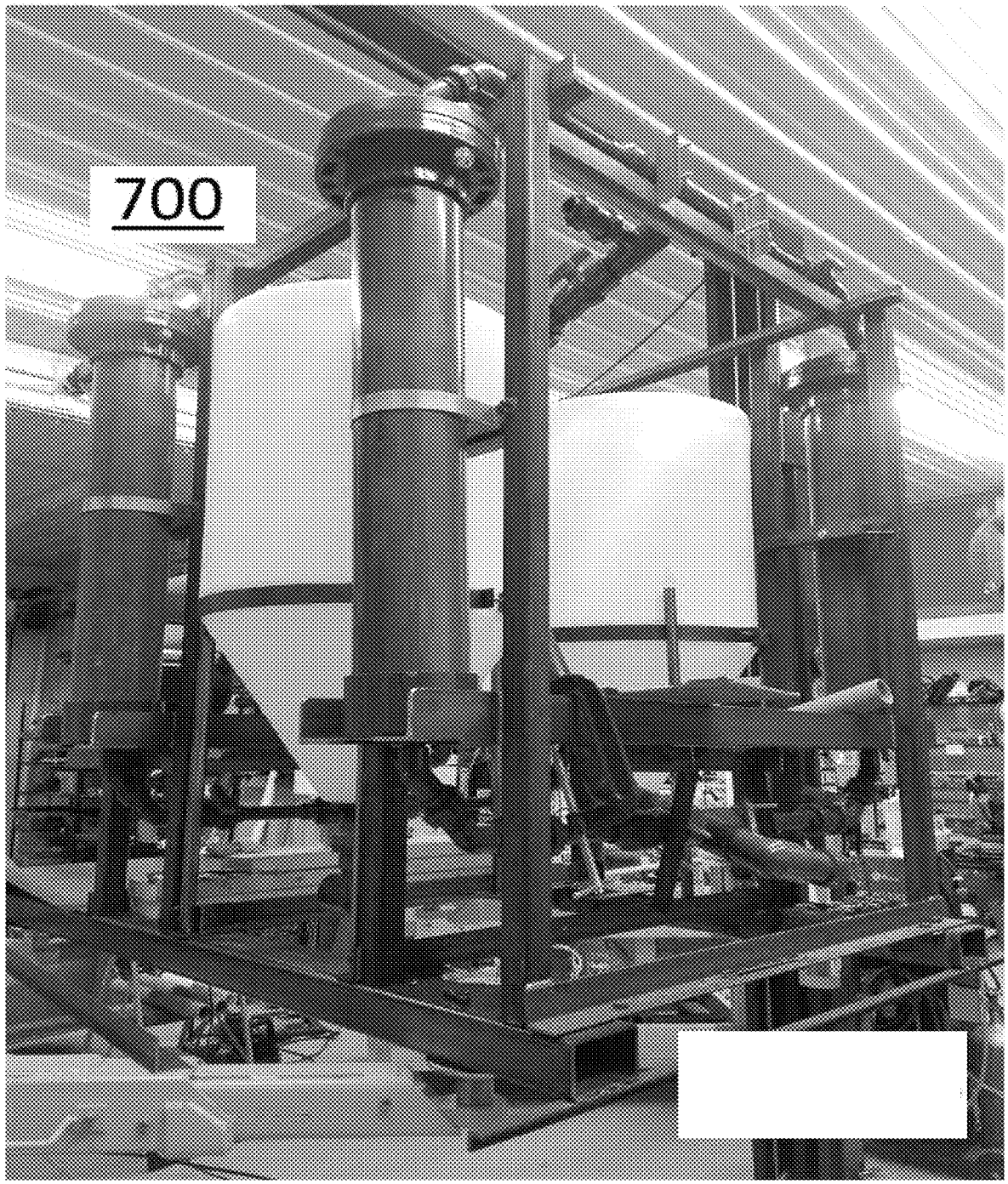
FIG. 13 depicts an electrocoagulation unit mounted on a skid.

As depicted in FIG. 13, the skid 700 is preferably mounted such that the entire skid may be moved via a device such as a lift truck wherein the tines of the lifting fork may be either inserted into tubes sized for the tines or may be placed below the lowest cross support member. Other means to allow for relocation of the skid such as mounting lifting lugs to the frame are also acceptable but not as preferable.

The electrocoagulation unit will remove from about 80 percent to about 99 percent of the contaminants from a fluid stream. The electrocoagulation unit is an inferior treatment when the influent is a high salt brine; the brine effects the electrical fields formed between TCE plates and at the edges of openings through the TCE plates which reduces the overall efficiency of the unit. To allow for the treatment of a high salt brine, the cells may incorporate a sacrificial anode to allow for reduction of the salinity of the influent and the polarity reversal of the plates is preferably reduced to about once per 22 seconds which allows for corrosion of the sacrificial anode and a reduction in the brackishness of the water while still minimizing corrosion on the TCE plates. The sacrificial anode may be comprised of black iron, zinc, magnesium or the like, The efficiency of the unit may be reduced to about 30% if required to meet maximum contaminant concentration limits enforced by treatment facilities.

If pressure drop through the cell is measured to be increasing above the preferred range, the flow rate of fluid into the system can be adjusted via the variable speed pump to reduce the amount of contaminants precipitated out of solution via the electrocoagulation process.

Figure 14:
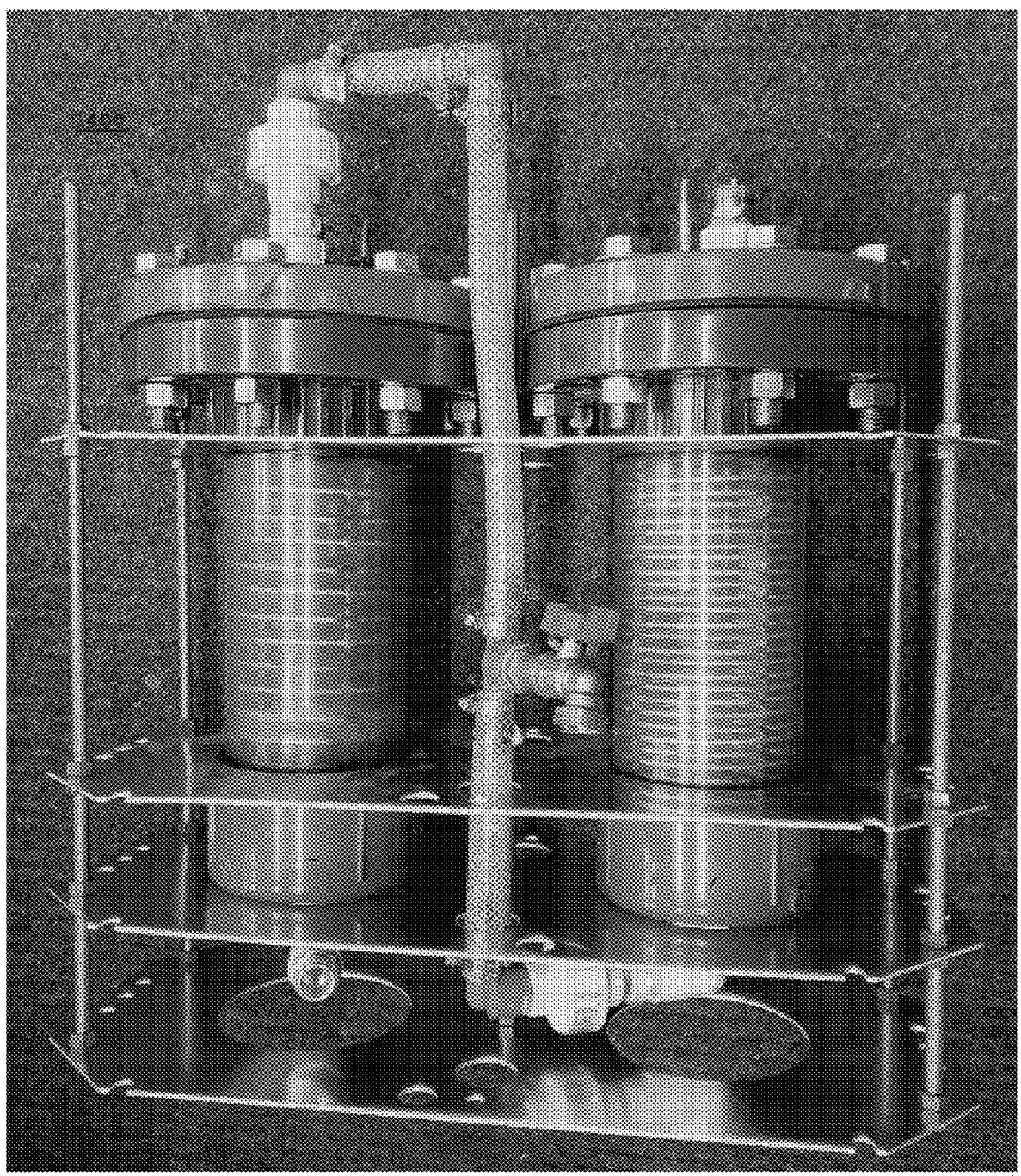
FIG. 14 depicts an electrocoagulation unit for a single unit residence.

The effluent from the electrocoagulation skid can be used as a feed stream to other fluid treatment systems for tertiary treatment. Such fluid treatment systems include processes such as reverse osmosis units, sand filtration, and the like. In another embodiment of the present invention which would be preferentially used for water purification for single dwelling homes to provide water for non-potable uses such as lawn watering, depicted in FIG. 14, the cell 1400 would typically comprise about 20 TCE plates wherein each plate would have a diameter of about 4 inches with a plate spacing of about 0.5 inches between each plate.

Figure 15A:
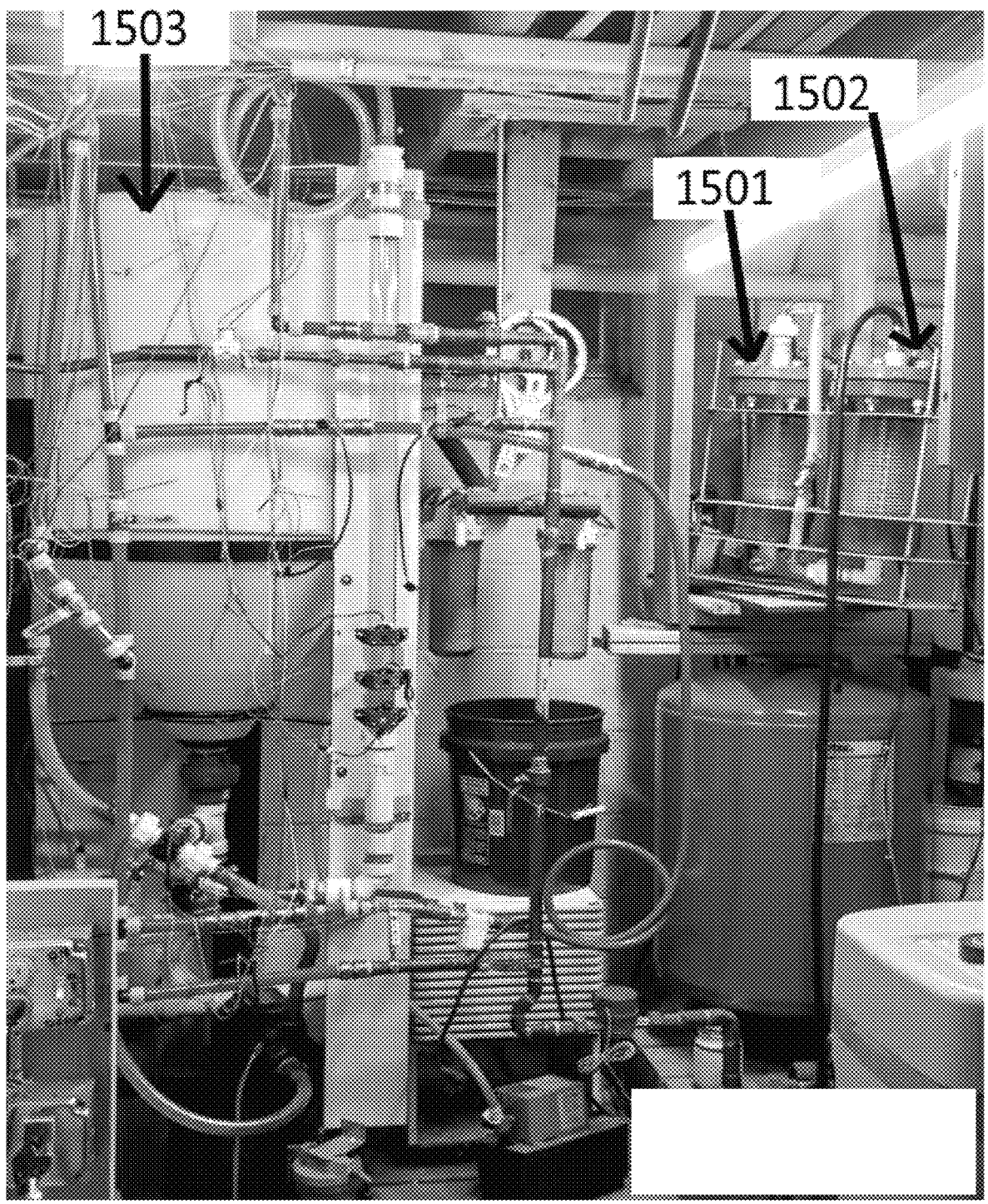
FIGS. 15A-15C depict an electrocoagulation unit for a single unit residence mounted on a skid.
Figure 15B:
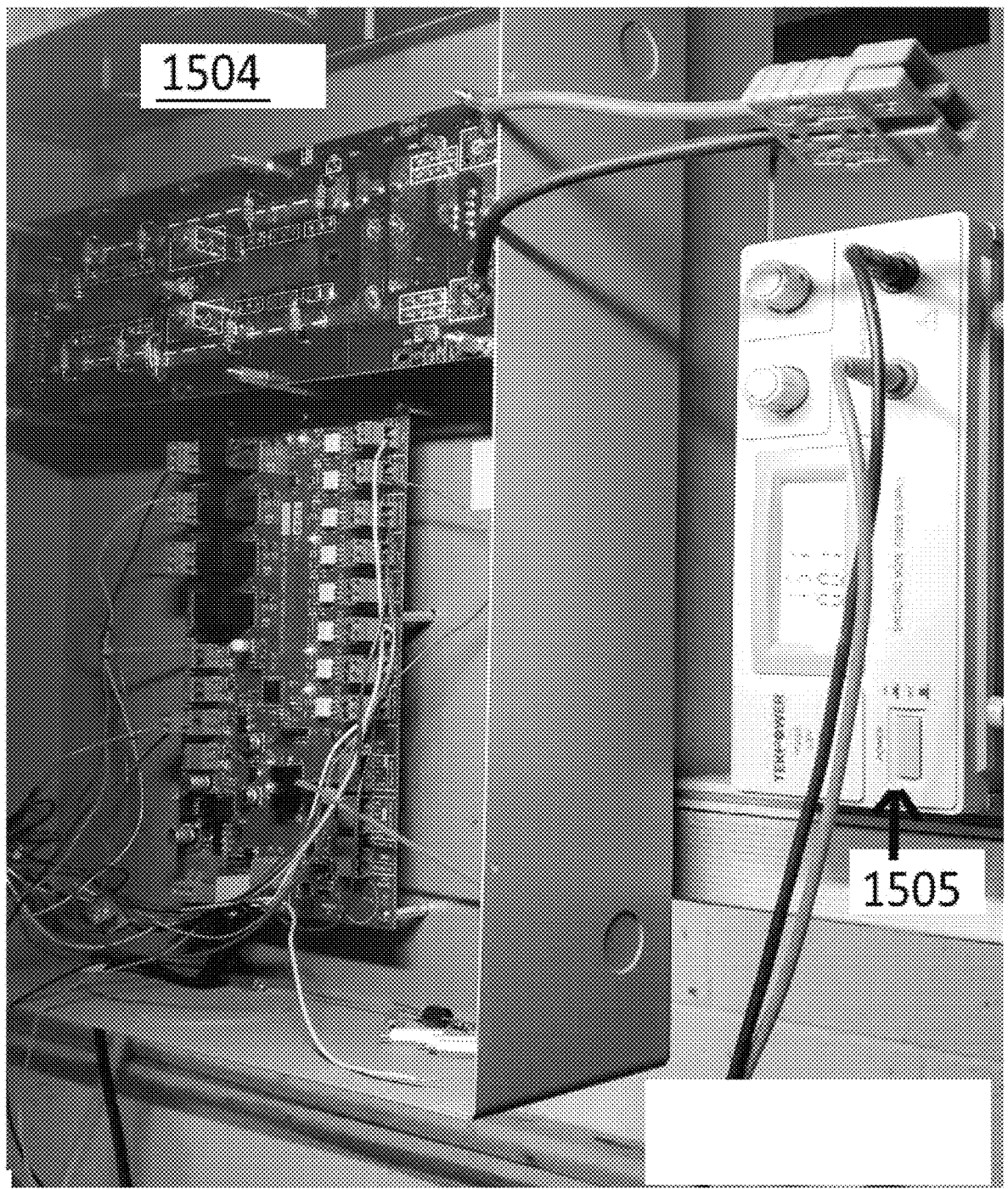
Figure 15C:
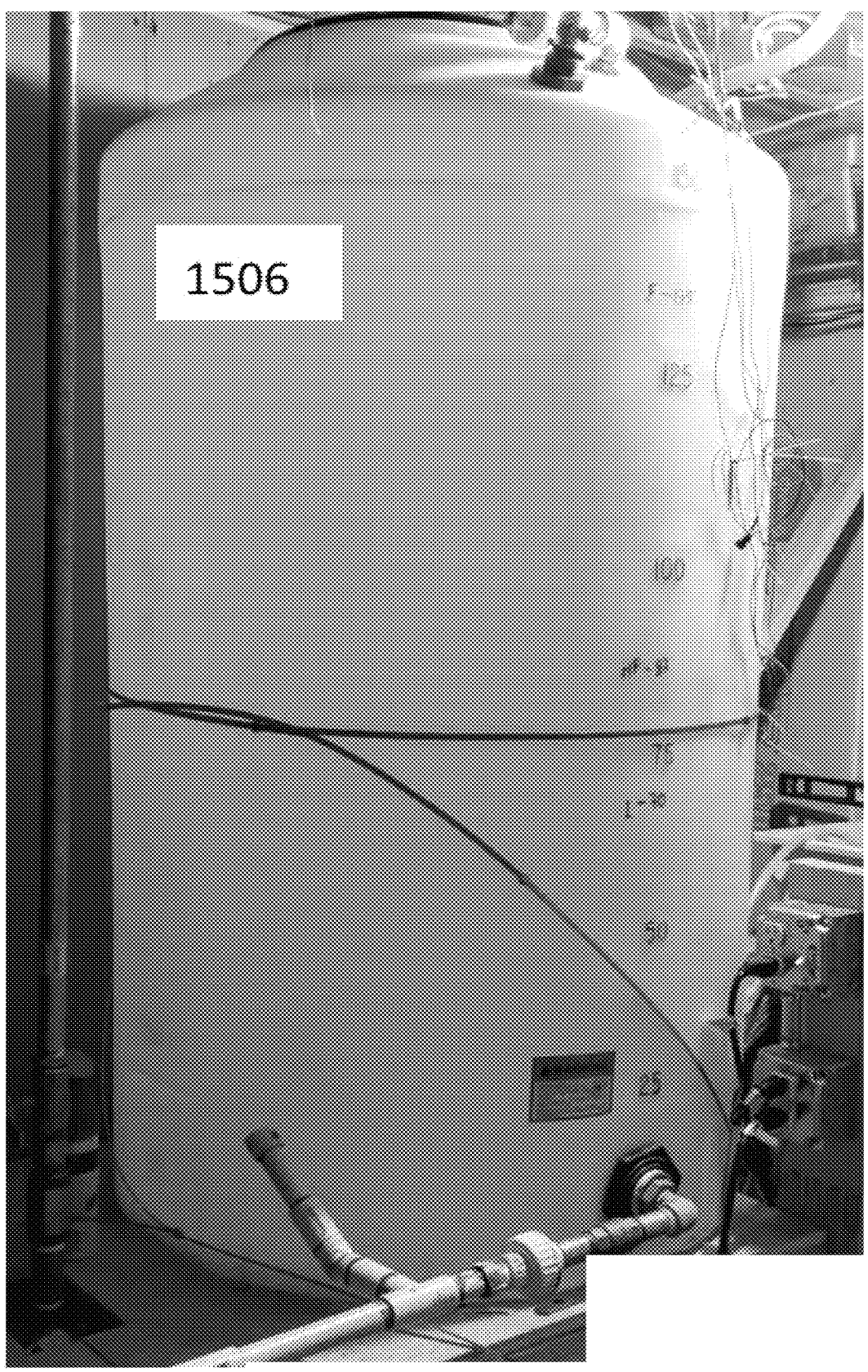

Referring to FIGS. 15A-C a preferred embodiment of an electrocoagulation system 1300 for use in a residential building is depicted therein. System 1300 may be particularly useful in settings where the residential building is a single family home which draws the water to be used daily from a private water well and particularly a low-output private water well such as a well producing from about 1 gallon per minute up to about 3 gallons per minute of water. The system is preferably set up with a holding tank on the inlet to the electrocoagulation system skid, wherein the holding tank is sized to store a desired amount of water such as at least one day's worth of anticipated water consumption and the effluent from the electrocoagulation system skid discharges into a pair of discharge holding tanks. Each discharge holding tank is sized to allow for a day's worth of typical water usage to be stored in the tank and the water may be drawn directly for usage or may be fed to a further tertiary treatment system.

If pressure drop through the cell is measured to be increasing above the preferred range, the flow rate of fluid into the system can be adjusted via the variable speed pump to reduce the amount of contaminants precipitated out of solution via the electrocoagulation process.

This system may be adjusted to allow for increased contaminant removal via reduced flow through the system when demand for water is lower than design capacity. The electrocoagulation device 1300 may be comprised of a primary TCE reaction chamber 1301 (similar to that depicted as TCE 804) wherein the individual TCEs are constructed of a material such as mild steel; a secondary TCE reaction chamber 1302 (similar to that depicted as TCE 806) wherein the individual TCEs are constructed of a material such as aluminum; a settling chamber 1303 wherein fluid processed through the primary TCE reaction chamber 1301 and the secondary TCE reaction chamber 1302 is allowed to settle; a brain box 1304, with connections to OPTIONAL fluid temperature sensor, OPTIONAL fluid flow sensor, OPTIONAL fluid pressure sensor, OPTIONAL voltage sensor, and OPTIONAL clamp-on current sensor; a power supply 1305 which provides AC input and DC output to the unit; and an optional additional holding chamber 1306 where fluid allowed to settle in 1303 can be drawn off and stored for use in a household, small office, or other such structure. This system may be adjusted to allow for increased contaminant removal via reduced flow through the system when demand for water is lower than design capacity.

A beneficial feature of the system is the ability for an operator to take a specific reaction chamber or chambers out of service while allowing for the overall system to stay in service, provided more than a single reaction chamber is in service in the module. The system can be moved in a modular fashion via the palette it is mounted to. By placing additional reaction chambers in parallel, the system may be expanded modularly. As is readily apparent, a skid may be configured to allow the system to be drained gravimetrically should the system lose power. The system may also be configured to allow for a constant voltage on the power to the reaction chambers, a constant current on the power to the reaction chambers, or both.

An additional embodiment, not depicted, provides an electrocoagulation skid designed to treat industrial plating waste water such as a water reclamation system suitable for a printed circuit board fabrication facility. By configuring the system to use higher levels of electrical power and multiple parallel trans-channel reaction chamber 200s to reclaim a large volume of plating waste water quickly between manufacturing runs with a greatly reduced requirement for holding tanks.

Although several embodiments of the present invention, methods to use said, and its advantages have been described in detail, it should be understood that various changes, substitutions, and alterations can be made herein without departing from the spirit and scope of the invention as defined by the appended claims. The various embodiments used to describe the principles of the present invention are by way of illustration only and should not be construed in any way to limit the scope of the invention. Those skilled in the art will understand that the principles of the present invention may be implemented in any suitably arranged device. Additionally, a number of well-known processes and elements have not been described in order to avoid unnecessarily obscuring the present invention. Accordingly, the above description should not be taken as limiting the scope of the invention.

I claim:

1. An electrocoagulation electrode, comprising:
a conductive material or a material coated with a conductive metal, or a material impregnated with a conductive metal;
cutouts along the outside edge; and
openings in the surface which pass through the thickness of the material;
further comprising a reaction cell casing wherein said casing has an inlet opening and an outlet opening;
wherein said electrocoagulation electrode may alternatively be an anode and a cathode as an electrical current polarity is repeatedly reversed through the electrocoagulation electrode wherein total cross-sectional area of all cutouts along the outside edge and all openings in the surface is less than the total cross-sectional area of the reaction cell casing inlet opening and the openings in the surface situated towards the center of the electrocoagulation electrode surface are smaller than the openings in the surface situated towards the outer edge of the electrocoagulation electrode and
wherein the openings are rectangular, hexagonal, or multipoint star shaped or circular.

2. The electrocoagulation electrode of claim 1 wherein the conductive material is selected from the group iron, steel, aluminum, and titanium.

3. An electrocoagulation reaction cell, comprising:
a series of at least one pair of two of the electrocoagulation electrode of claim 1 arranged parallel to one another in a stack such that individual electrocoagulation electrodes of claim 1 do not make contact in an electrically conductive fashion; a first set of electrically conductive rods; and a second set of electrically conductive rods;

wherein a designation assigned to each of the electrocoagulation electrodes of a pair of electrocoagulation electrodes of claim 1 in the stack of either anode or cathode;

conductive anchor points between the first set of electrically conductive rods and all anodes, made at the cutouts along the outside edge of each anode;

the first set of electrically conductive rods passing through the cutouts along the outside edges of all cathodes without making contact with the cathodes in an electrically conductive fashion;

conductive anchor points between the second set of electrically conductive rods and all cathodes, made at cutouts along the outside edge;

the second set of electrically conductive rods passing through cutouts along the outside edges of all anodes without making contact in an electrically conductive fashion with the anodes; and the first and second sets of electrically conductive rods are anchored within the casing; forcing a fluid to flow through the electrocoagulation cell by passing through the openings in the surface of the anodes and cathodes.

4. The electrocoagulation cell of claim 3, wherein a rotation is applied to all cathodes prior to being anchored to the second set of electrically conductive rods, such that the openings in the surface of each cathode are non-aligned with the openings in the surface of adjacent anodes.

5. The electrocoagulation cell of claim 4 wherein the housing is oriented along a vertical axis and the cathodes and anodes are oriented along a horizontal axis.

6. The electrocoagulation cell of claim 4 wherein the flow rate of fluid through the openings in the surface is less than 6 feet per second.

7. The electrocoagulation cell of claim 4 further comprising an adjustable power source wherein the at least one anode is connected to the output of the adjustable power source and the at least one cathode is connected to the ground return of the same adjustable power source.

8. The electrocoagulation cell of claim 7 wherein the adjustable power source comprises a programmable logic controller and an H-Bridge.

9. The electrocoagulation cell of claim 8 wherein the polarity of the output of the adjustable power source is reversed repeatedly.

10. The electrocoagulation cell of claim 9 wherein the frequency of the polarity reversal is about 100 times per second.

11. The electrocoagulation cell of claim 9 wherein the frequency of the polarity reversal is about 10 times per second.

12. The electrocoagulation cell of claim 9 wherein the frequency of the polarity reversal is about once per 22 seconds.

* * * * *